US012756479B2

(12) United States Patent
Hoelen et al.

(10) Patent No.: US 12,756,479 B2
(45) Date of Patent: Oct. 6, 2026

(54) OPTICAL RECEIVING APPARATUS

(71) Applicant: SIGNIFY HOLDING B.V., Eindhoven (NL)

(72) Inventors: Christoph Gerard August Hoelen, Valkenswaard (NL); Joris Jan Vrehen, Waalre (NL); Johan Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 219 days.

(21) Appl. No.: 18/728,913

(22) PCT Filed: Jan. 11, 2023

(86) PCT No.: PCT/EP2023/050530
§ 371 (c)(1),
(2) Date: Jul. 15, 2024

(87) PCT Pub. No.: WO2023/135161
PCT Pub. Date: Jul. 20, 2023

(65) Prior Publication Data

US 2025/0175256 A1 May 29, 2025

(30) Foreign Application Priority Data

Jan. 17, 2022 (EP) .................................... 22151710

(51) Int. Cl.

| | |
|---|---|
| ***H04B 10/67*** | (2013.01) |
| ***G02B 26/08*** | (2006.01) |
| ***G02B 26/10*** | (2006.01) |
| ***H04B 10/40*** | (2013.01) |
| ***H04B 10/50*** | (2013.01) |
| ***H05B 47/195*** | (2020.01) |

(52) U.S. Cl.
CPC ......... *H04B 10/67* (2013.01); *G02B 26/0875* (2013.01); *G02B 26/101* (2013.01); *H04B 10/40* (2013.01); *H04B 10/501* (2013.01); *H05B 47/195* (2020.01)

(58) Field of Classification Search
None
See application file for complete search history.

(56) References Cited

U.S. PATENT DOCUMENTS 9,048,633 B2 6/2015 Gronenborn et al.
2019/0268068 A1 8/2019 Dacha et al.
(Continued)

*Primary Examiner* — David W Lambert

(57) ABSTRACT

Optical beam-steering apparatus whereby an actuator effects relative movement, in a first direction, between an optical component comprising one or more lenses and a series of active transmitting or receiving elements, each active element disposed behind a respective one of the lenses. Different active elements are arranged at different positions relative to their respective lens in a second direction non-parallel to the first direction. Thus by selecting which of the first active elements to activate using the addressing circuitry, a first transmitting or receiving beam can be controlled to be formed at a selected angle in one dimension. Whereas by operating the actuator to effect a relative motion between the optical component and the series of active elements in the first direction, the first transmitting or receiving beam can be controlled to be formed at a selected angle in another, non-parallel dimension.

15 Claims, 11 Drawing Sheets

(56) References Cited

U.S. PATENT DOCUMENTS

| | | | |
|---|---|---|---|
| 2019/0369298 A1 | 12/2019 | Ja et al. | |
| 2019/0376663 A1 | 12/2019 | Gladden et al. | |
| 2020/0321378 A1* | 10/2020 | Paiella | H10F 39/806 |
| 2021/0116655 A1 | 4/2021 | Grieco et al. | |

* cited by examiner

OPTICAL RECEIVING APPARATUS

CROSS-REFERENCE TO PRIOR APPLICATIONS

This application is the U.S. National Phase application under 35 U.S.C. § 371 of International Application No. PCT/EP2023/050530, filed on Jan. 11, 2023, which claims the benefit of European Patent Application No. 22151710.5, filed on Jan. 17, 2022. These applications are hereby incorporated by reference herein.

TECHNICAL FIELD

The present disclosure relates to the transmission and/or reception of signals via the medium of infrared, visible and/or ultraviolet light.

BACKGROUND

Light can be used to transmit signals such as digital data modulated into the light. The term "Light" herein may refer to infrared light, visible-spectrum light or ultraviolet light, or any combination of these. When transmitting light signals, then in order to save power, it is often desirable to use beamforming or beam-steering techniques to emit the light in the form of a directed beam, rather than broadcasting the light signals omnidirectionally. The transmit beam may be directed toward a specific remote device which is to receive the signal. Similarly, a light receiving apparatus may use receive beamforming or beam-steering techniques in order to form a solid angle relative to the receiver within which lights signals will be preferentially received (a receive beam). Note that a receive beam or receiving beam herein refers to a field of view (FoV) or field of sensitivity, not an incoming transmitted beam that is directed toward the receiving apparatus from a complementary remote device. The receive beam may be directed toward a specific remote device which is transmitting the signal. This will reduce the amount of background noise and/or interference relative to the desired signal to be received. In some cases beamforming or steering techniques may be used at both the transmit and receive side, such that a transmit beam and receive beam are aligned with one another. The incoming light beam should at least partially overlap with the FoV of the receive beam in order to be detectable.

An example application of communication via light is found in a luminaire, which can sometimes also be used as a data access point for the transmission and/or reception of data. For example the luminaire could be mounted on the ceiling in an office or such like. At one time, if it was desired to convey data in the light emitted by a luminaire, a code was embedded in the visible illumination emitted by the luminaire (so-called "coded light"), and the receiver would then use this code to look-up the required data via a separate radio channel (e.g. Wi-Fi). Nowadays however, an alternative is to integrate an infrared, visible light and/or ultraviolet transmitter and/or receiver into the luminaire, so as to communicate the desired data to and/or from the remote device directly embedded in the infrared light. An example of such a technology is sometimes referred to as "Li-Fi".

US2021/0116655A1 (Grieco) discloses an optical system for beam steering. The system comprises a 2D array of emitter elements, each located at a fixed position behind a different respective part of a fixed diffractive lens system, where different parts of the lens system have different diffractive properties corresponding to different beam directions. See for example FIGS. 2A and 2B of Grieco. The emitters can be selectively turned on and off, and not all of the emitter elements are turned on to emit the signal at any one time. Depending on which emitter element is selected to emit the light signal, the light will be emitted at an angle determined by the respective part of the lens element behind which the activated element is disposed.

SUMMARY

Grieco thus discloses a purely optical system and teaches specifically to use no moving mechanical parts.

However, it is recognized herein that the 2D addressing circuitry required to selectively activate any of a 2D array of emitter elements is quite complex electronically speaking. It would be desirable to avoid this electronic complexity.

An alternative would be a mechanical approach whereby a lens is moved relative to a light emitting element (either by moving the lens or the emitter element), so that the relative position of the emitting element behind the lens determines the direction of the emitted beam. However, it is recognized herein that a 2D mechanical actuator to move the lens or emitter independently along two perpendicular axes would be very complex mechanically speaking.

The present disclosure provides a trade-off between electronic and mechanical complexity by providing an optical component and a series of two or more active emitting elements, whereby selective addressing of the emitter elements can be used to steer the beam in one dimension, whilst mechanical motion of the optical component can be used to steer the beam in another dimension. See for example FIGS. 1A and 1B of the present disclosure, to be discussed in more detail shortly.

Similar considerations can equally apply to receive beam steering where the active elements are receiving elements rather than emitting elements.

According to one aspect disclosed herein, there is provided an apparatus comprising: an optical component comprising at least one or more first lenses; at least a series of first active elements, each of the first active elements being operable to receive light;

an actuator arranged to effect a relative movement between the optical component and the series of first active elements in a first direction; and addressing circuitry operable to selectively activate different ones of the first active elements to receive light.

Each of the first active elements is disposed behind a respective one of the first lenses so as when activated to receive light through the respective lens. Further, different ones of the first active elements are arranged at different positions relative to their respective lens in a second direction non-parallel to the first direction, and thus by selecting which of the first active elements to activate using the addressing circuitry, a first transmitting or receiving beam can be controlled to be formed at a selected angle in a second dimension as determined by the position of the activated element relative to its respective lens. Whereas by operating the actuator to effect a relative motion between the optical component and the series of first active elements in the first direction, the first transmitting or receiving beam can be controlled to be formed at a selected angle in a first dimension non-parallel to the second dimension.

In embodiments the optical component comprises a lens array comprising a one-dimensional series of lenses and the active elements are arranged in a parallel one-dimensional series, where each emitter element is located behind a different one of the lenses and different emitter elements are positioned differently relative to their respective lenses along the axis of the array (e.g. the array of emitter elements has a slightly different pitch—i.e. spatial period—than the array of lenses).

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

The following describes a general beam steering system comprising a linear array of active electro-optical or opto-electrical elements, and an array of lenses (e.g. microlens array) whereby the position of the lens array can be adjusted relative to the active elements in a direction substantially perpendicular to the array of the active elements. Or an alternative is the complementary configuration, in which the lens array is adjustable in the direction of the array of active elements, and the various active elements have variation in their position in a direction perpendicular to the lens array (and the active elements array).

Embodiments also provide for control of the actuator so as to tune the direction of the beam based on a received signal.

Figure 1A:
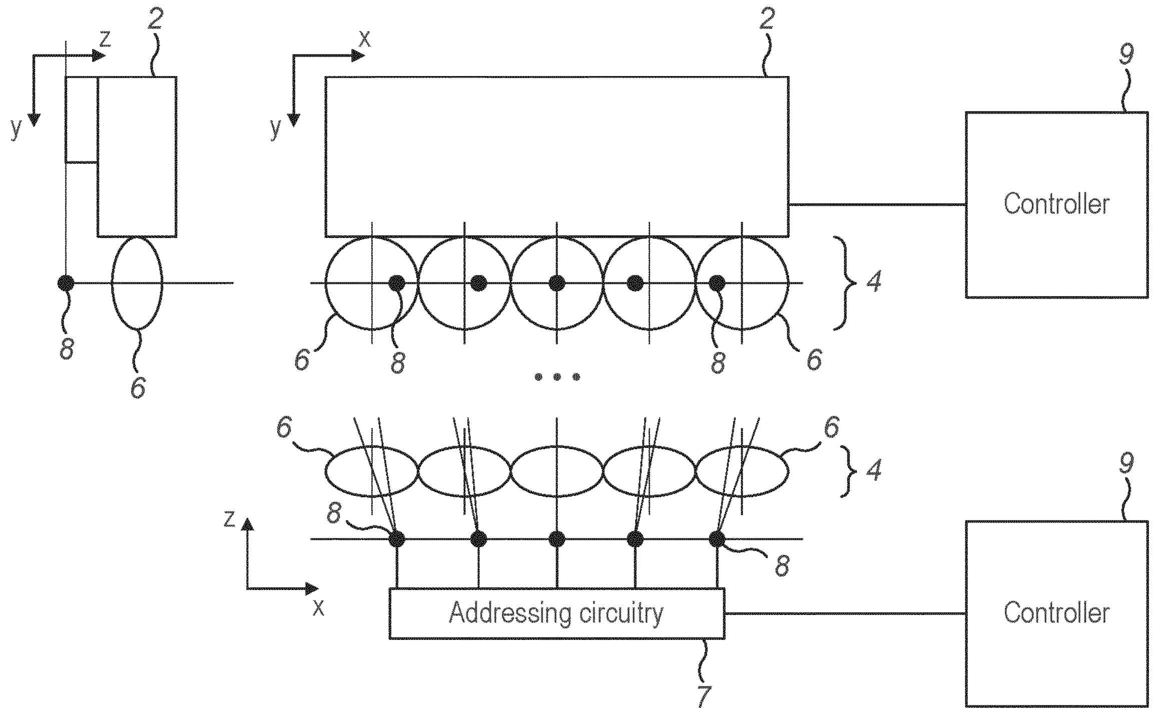
FIG. 1A is a schematic illustration of an optical beam-steering apparatus in accordance with embodiments disclosed herein.

FIG. 1A shows an optical beam-steering apparatus in accordance with embodiments disclosed herein. The apparatus comprises an actuator 2, and a lens array 4 mechanically coupled to the actuator 2, so as to be movable by the actuator 2. The lens array 4 comprises a spatial series of lenses 6, arranged in fixed positions relative to one another such that when the lens array 4 is moved by the actuator 2, all the lenses 6 of the array 4 move together in unison. In embodiments the lenses 6 of the lens array 4 may all be formed from the same continuous piece of optical material, e.g. the same piece of glass or the same piece of plastic (e.g. acrylic). Alternatively they could be produced from separate pieces of material and fixed to one another or the actuator 2. The apparatus also comprises a spatial series of active elements 8. These may be either light emitting elements (each comprising one or more light sources, e.g. LEDs) or light receiving elements (each comprising one or more photosensors, e.g. photodiodes).

In variants of the above, the actuator 2 may be arranged to move the series of active elements 8. Either way, the lens array 4 may be said to move relative to the active elements 8, whilst the positions the lenses 6 within the lens array remain fixed relative to one another, and the positions of the active elements 8 also remain fixed relative to one another.

The apparatus further comprises addressing circuitry 7 operatively coupled to each of the active elements 8, and a controller 9 operatively coupled to the actuator 2 and the addressing circuitry 7. The controller 9 may be implemented in the form of one or more processors and one or more memory units storing software arranged to run on the one or more processors, the software being configured so as when thus run to perform the operations of the controller 9.

Alternatively the controller 9 may be implemented in the form of dedicated hardware circuitry, or in configurable or reconfigurable circuitry such as a PGA or FPGA, or any combination of hardware and software.

In FIG. 1A the top right diagram shows the apparatus in a first plane, the top left diagram shows the apparatus in a second plane perpendicular to the first plane, and the bottom diagram shows the apparatus in a third plane perpendicular to the first and second planes. The relative orientation of the planes is marked by Cartesian axes x, y, z in the figure, though this does not necessarily imply any particular overall orientation of the apparatus as a whole. By way of illustration, in one possible application the apparatus is mounted on the ceiling of a room (e.g. office or home) or other enclosed space (e.g. gazebo or vehicle cabin). In this case the top-right diagram shows the apparatus in the plane of the ceiling (as if looking up at the ceiling or down through the ceiling); the top left diagram shows the apparatus side-on from one direction (looking along the length of the lens array 4 with the ceiling on the left or right); and the bottom diagram shows the apparatus side-on from another, perpendicular direction (viewing the full length of the lens array 4 from the side with the ceiling on the bottom). The same convention for showing the three views of the apparatus will be continued throughout several of the figures but for brevity will not be explained again each time. Note also that the diagrams are somewhat schematized and the relative dimensions and number of lenses 6 and active elements 8 need not be the same as shown. Further, the addressing circuitry 7 and controller 9 only intended to be represented in FIG. 1A as functional blocks and their orientation or placement is not intended to be shown by the three diagrams in the same way as the actuator 2, lens array 4 and series of active elements 8. The addressing circuitry 7 and controller 9 will not necessarily be shown again in every figure but will be understood to be present.

The series of lenses 6 in the lens array 4 is a linear series, i.e. the lenses 6 in the series are arranged along a one-dimensional axis. This could be a straight-line axis as illustrated, or a curved axis (e.g. an arc of a circle). Similarly the series of active elements 8 is a linear series, i.e. the active elements are arranged along a one-dimensional axis. Again this could be a straight-line axis as illustrated, or a curved axis (e.g. an arc of a circle). In such cases the axis or series may still be described as one dimensional in that the lenses 6 are constrained to being positioned along a single curve or line, and similarly for the active elements 8. The axis of the series of active elements 8 is substantially parallel to the axis of the series of lenses 6. So if the series of lenses 6 is arranged in a straight line, the series of active element 8 is also arranged in parallel straight line; or if the series of lenses 6 is arranged along a curve such as an arc, then the series of active elements 8 is arranged along a parallel arc or curve.

Each respective one of the active elements 8 is located behind a different respective one of the lenses 6 in the lens array 4. "Behind" in this context means that if the plane of the lens array divides the environment into two halves with the active elements 8 on one side and a remote device 14 with which the apparatus is to communicate on the other, then if the respective active element 8 is an emitter, it is arranged so as when activated to emit light through the respective lens 6 out onto the side of the remote device 14, or if the respective active element 8 is a receiver, it is arranged so as when active to receive light through its respective lens 6 from the side of the environment in which the remote device 14 is located. For instance if the apparatus is mounted on the ceiling to communicate with a remote device below the ceiling, then the active elements 8 would be above the lenses 6. The remote device 14 is not shown in FIG. 1A but is shown in FIGS. 2A-3B to be discussed in more detail shortly.

The spacing of the active elements 8 in the series is not exactly the same as the spacing of the lenses 6 in the lens array 4. Rather, each active element 8 is offset by a different amount relative to its respective lens 6 along the direction of the axis of the series of active elements 8 (which is parallel to the series of lenses 6). For instance, the series of lenses 6 may have a first pitch (i.e. spatial period) between lenses 6 along its axis, and the series of active elements 8 may have a second pitch (spatial period) between active elements 8 along its axis, wherein the second pitch is different than the first (but still close enough to keep each active element 8 behind a respective one of the lenses 6). In other words, each active element 8 has a different respective alignment relative to its respective lens 6 in the direction along the axis of the series.

The effect of this feature is that, because each active element has a different relative displacement relative to it respective lens 6, then when that element 8 is activated, it will form a beam in a respective direction dependent on the position of the element 8 relative to its respective lens 6. So different elements 8 will form beams in different directions. Thus by selecting which active element 8 to activate via the addressing circuitry 7, the controller 9 can select the direction of the beam being formed by the apparatus in a first dimension. The addressing circuitry may be controlled to activate only a single one of the active elements 8 at any one time, so as to form a single transmit or receive beam. Alternatively multiple selected elements 8 (but fewer than the entire series) could be activated at once in order to form multiple beams, or perhaps increase the width of the beam in the case of adjacent elements.

The addressing circuit 7 may be operable to select a subset of one or more of the active elements 8, so as to form or more beams. In embodiments the addressing circuit 7 may be operable to select to activate any individual one of the elements 8 at once, or any selected combination.

If the active elements 8 are light emitting elements, then the activated element will emit a beam of light (comprising a signal modulated into the light) in a selected direction defined by the position of the activated element 8 relative to its respective lens 6. Or if the elements 8 are receive elements, then the activated element will selectively or preferentially receive light signals from a particular direction (i.e. form a receive beam) defined by the position of the activated element 8 relative to its respective lens.

However, if the positions of the active elements 8 relative to their respective lenses 6 only differ along the 1D axis of the series of active elements 8 (and therefore also along the direction of the axis of the series of lenses which is parallel), then the selection of different active elements 8 via the addressing circuitry 7 will only vary the direction of the beam in a first dimension, e.g. which could be labelled the theta dimension in spherical polar coordinates (note that "dimension" or axis" in the present disclosure do not necessarily limit to a Cartesian coordinate system). Put another way, the section of active elements 8 steers the beam only in a first plane (e.g. a first vertical plane if the apparatus is facing down from the ceiling or up from a horizontal surface such as the floor or a desk or other worksurface).

In order to steer the beam in a second dimension, the actuator 2 is arranged to move the lens array 4 relative to the series of active elements 8, under control of the controller 9.

The actuator 2 can move the relative position of the lens array 4 perpendicular to the axis of the series of active elements 8, and therefore can steer the beam in the second dimension. E.g. the second dimension could be labelled as the phi dimension in a coordinate system whereby theta and phi are angles in two orthogonal planes. In other words theta may be described as the angle between a first Cartesian axis and the projection of the direction vector of the beam onto the Cartesian plane coinciding with the first Cartesian axis, and phi may be described as the angle between a second Cartesian axis (orthogonal to the first) and the projection of the direction vector of the beam onto the Cartesian plane coinciding with the second Cartesian axis. In embodiments each of theta and phi can vary over a range up to pi steradian.

Thus, the movement of the actuator 2 steers the beam in a second plane perpendicular to the first plane (e.g. a second vertical plane if the apparatus is facing down from the ceiling or up from a horizontal surface such as the floor or a desk or other worksurface).

In the illustrated examples it is envisaged that series of lenes 6 is arranged along a straight line and the series of active elements 8 is arranged along a parallel straight line. In this case the actuator 2 is arranged to effect a translational (lateral) motion between the series of lenses 6 and the series of active elements 8. However this is not the only possibility. For example if both series are arranged along parallel arcs, then the actuator 2 may be arranged to move the lenses or elements 8 in the direction along the arced axis. E.g. the lenses 6 may be arranged tangentially along an arc of a circle, attached to a rotary actuator with its rotor at the focus of the arc.

Preferably, for reduced electrical and mechanical complexity, the addressing of different active elements 8 (via the addressing circuitry 7) can only steer the beam in the first dimension and not the second dimension, whilst the mechanical motion of the lens array 4 relative to the active elements (via the actuator 2) can only steer the beam in the second dimension and not the first dimension.

Figure 1B:
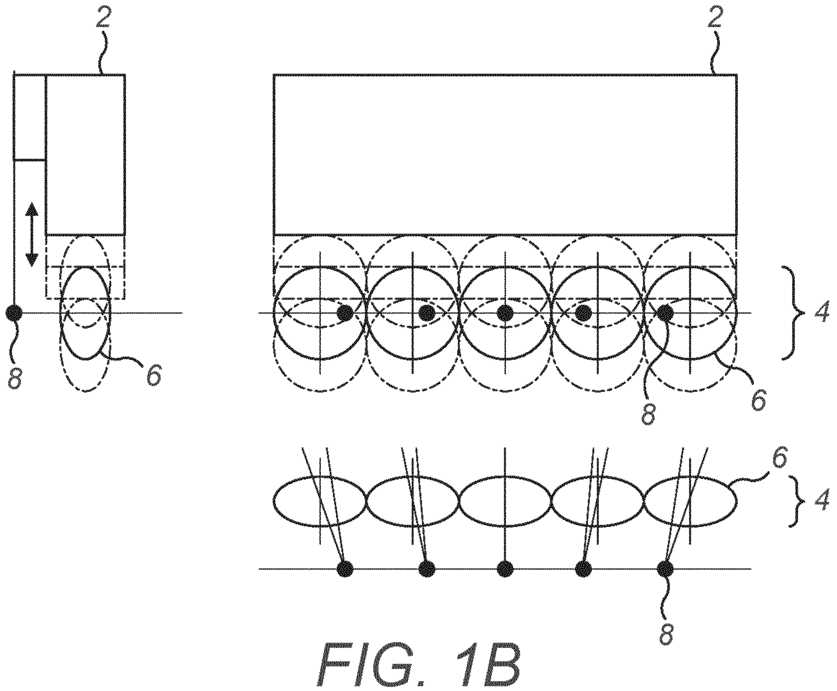
FIG. 1B is another schematic illustration of an optical beam-steering apparatus in accordance with embodiments disclosed herein.

The motion of the lens array 4 by the actuator 2 is illustrated in FIG. 1B. Note that moving the lens array 4 relative to the series of active elements 8 could mean either moving the lens array 4 or moving the series of active elements 8. Depending on implementation, the actuator 2 could be arranged to work either way. Note also that when the lens array 4 is moved, all the lenses 6 in the array move together in unison (e.g. because they are all formed from the same piece of optical material or are all attached to one another in the array) whilst the active elements 8 remain fixed relative to one another. Or similarly if the active elements 8 are moved, they all move in unison whilst the lenses 6 in the lens array 4 remain fixed relative to one another.

The actuator 2 is arranged such that when the controller 9 controls the actuator 2 to move the lens array 4 relative to the series of active elements 8, it changes the relative positions of the active elements 8 relative to the lenses 6 in a direction perpendicular to the axis of the series of active elements 8 (and therefore also perpendicular to the axis of the series of lenses 6 within the array 4, which is parallel to the series of active elements 8). Thus the motion by the actuator 2 steers the transmit or receive beam in the second dimension perpendicular to the first dimension.

The steering of the beam in the two perpendicular dimensions is illustrated in FIGS. 2A to 3B.

Figure 2A:
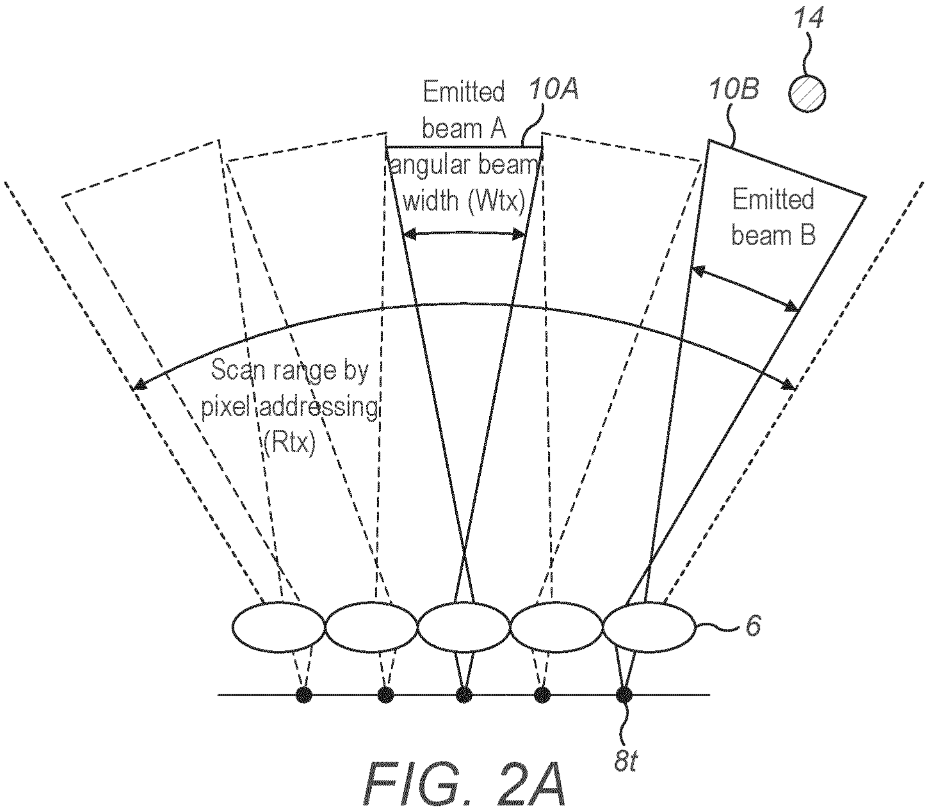
FIG. 2A is another schematic illustration of an optical beam-steering apparatus in accordance with embodiments disclosed herein.
Figure 2B:
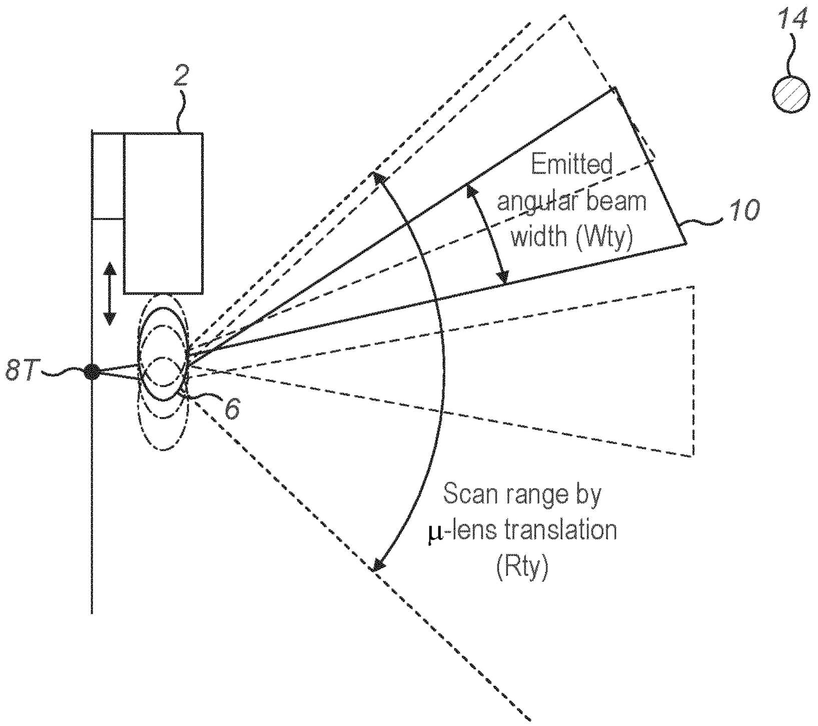
FIG. 2B is another schematic illustration of an optical beam-steering apparatus in accordance with embodiments disclosed herein.

FIGS. 2A and 2B show the steering of a transmit beam in the case where the active elements 8 are emitting (transmitting) elements 8T used to form an emitted beam 10. By way of illustration FIG. 2A shows two such beams 10A, 10B formed by two respective emitting elements 8T being activated, but in other use cases there could be only one such beam or more than two beams. The (or each) beam has an angular width Wtx in the first dimension and Wty in the second dimension, both determined by the optical properties of the respective lens 6 and by the relative orientation of lens and emitting element. The lens 6 could be a condensing (i.e. positive) lens or a diverging (i.e. negative) lens. The apparatus as a whole has a scan range Rtx in the first dimension, this range being determined the addressing of different active elements 8T (which may also be referred to as "pixels") and their positing along the axis of the series of lenses 6; and a scan range Rty in the second dimension, this range being determined by the lateral translation of the lens array 4 relative to the active elements 8T via the actuator 2.

Figure 3A:
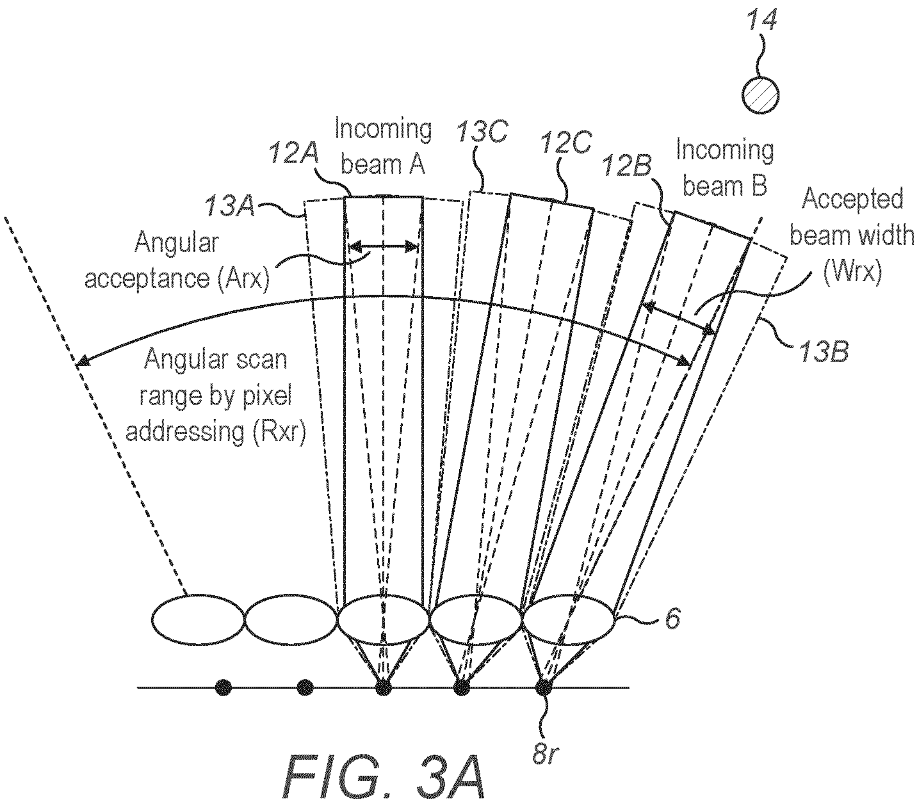
FIG. 3A is another schematic illustration of an optical beam-steering apparatus in accordance with embodiments disclosed herein.
Figure 3B:
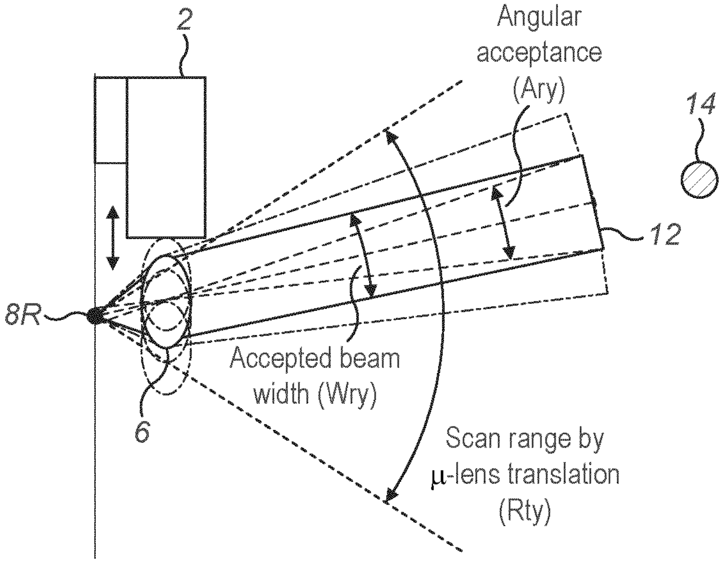
FIG. 3B is another schematic illustration of an optical beam-steering apparatus in accordance with embodiments disclosed herein.

FIGS. 3A and 3B show the steering of a receive beam in the case where the active elements 8 are receiving elements 8R used to form a receive beam 13 (i.e. a cone or region of space in which light signals are preferentially received) for receiving an incoming beam 12. By way of illustration FIG. 3A shows two three incoming beams 12A, 12B, 12C received by three respective receiving elements 8R being activated, but in other use cases there could be only one or two such beams, or more than three beams. In the example of the figure, each beam labelled 12 is an incoming parallel beam that is detected from a certain direction when the source is infinitely far away. The angular sensitivity of the specific sensing element plus lens, however, is wider. The receiving beams (fields of view) of adjacent elements 8R may be overlap to make sure that there are no gaps in between. The incoming beams 12 could also have a slightly different angle of incidence, as long as they're within the angular acceptance range of the respective element 8R.

In FIGS. 3A-B, the possible beam directions are indicated by the dotted lines (one could also consider this as the directions for a point receiver and a source in infinity), and are collinear with the sides of the beams. The angular acceptance (Arx) is the range of angles over which the incoming beam direction may vary to result in at least partial detection of that beam by a given sensor element 8 at a given position. The accepted beam width (Arw) is the diameter of a parallel beam that is detected by the sensor element (and therefore measured in a plane perpendicular to this beam.

The (or each) receiving beam has an angular acceptance Arx in the first dimension and Ary in the second dimension, both determined by the optical properties of the respective lens 6, as well as by the relative configuration of lens and sensor element and the actual dimensions of the sensor element. Again the lens 6 could be a collimating lens or a diverging lens. The apparatus as a whole has a scan range Rrx in the first dimension, this range being determined by the addressing of different active elements 8R (which may also be referred to as "pixels") and their position along the axis of the series of lenses 6; and a scan range Rry in the second dimension, this range being determined by the lateral translation of the lens array 4 relative to the active elements 8R via the actuator 2.

FIGS. 2A to 3B also show a remote device 14 with which the apparatus may be used to communicate via signals embedded in the emitted or received light. For instance the apparatus may be comprised within an optical access point installed on the ceiling of a room, and the remote device 14 may be a device within the room, or vice versa. In the case where the active elements 8 of the apparatus are receiving elements 8R, the remote device 14 comprises a transmitter for emitting light signals to be detected by the receiving apparatus. In the case where the active elements 8 of the apparatus are transmitting elements 8T, the remote device 14 comprises a receiver for receiving light signals emitted by the transmitting apparatus. Either way, the controller 9 of the apparatus may be configured to use the addressing circuitry 7 and actuator 2 to direct the transmit or receive beam 10/13 toward the remote device 14.

Figure 4A:
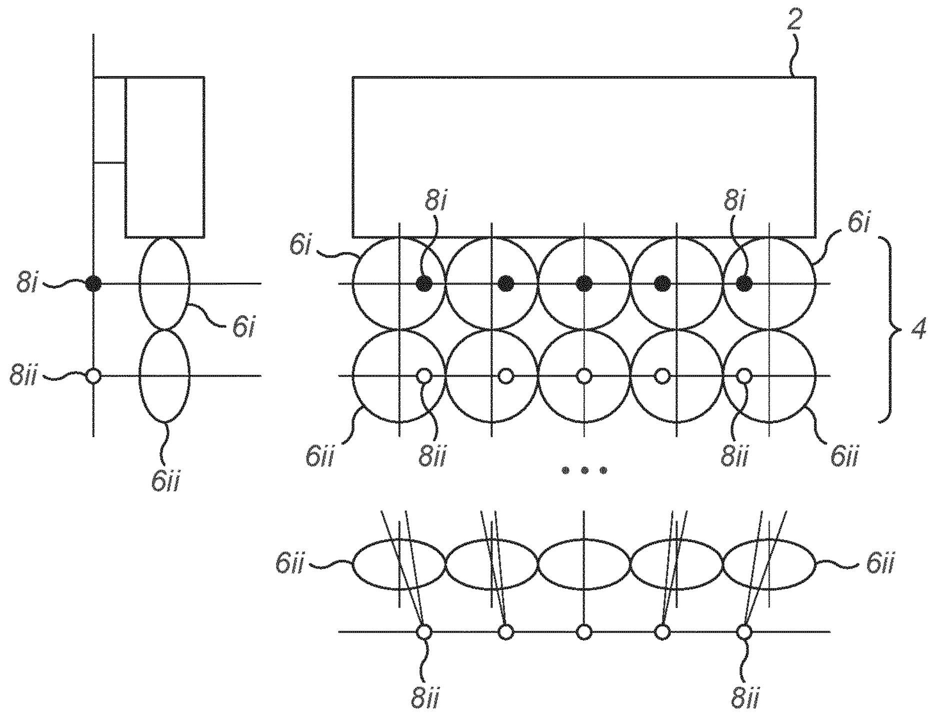
FIG. 4A is a schematic illustration of a variant of an optical beam-steering apparatus employing two parallel lens arrays in accordance with further embodiments disclosed herein.
Figure 4B:
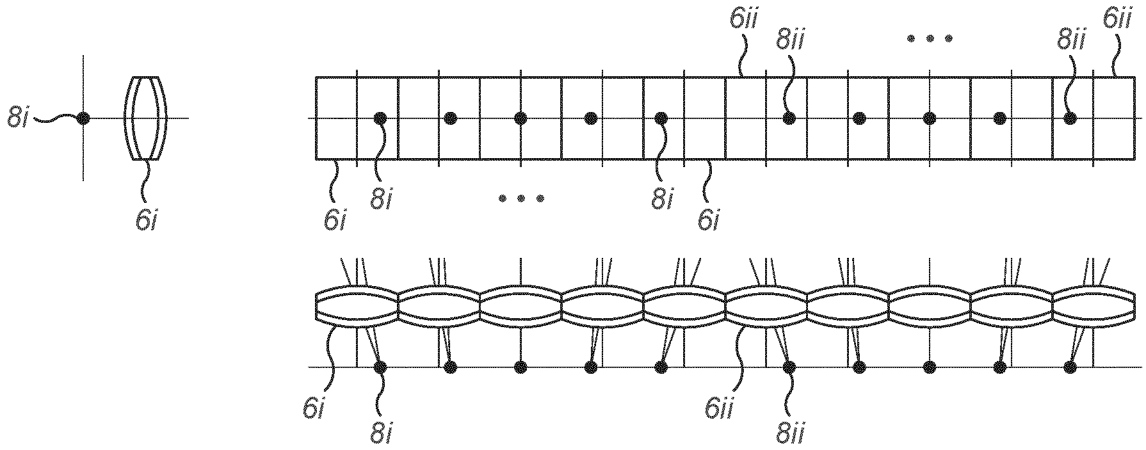
FIG. 4B is a schematic illustration of another optical beam-steering apparatus employing two parallel lens arrays in accordance with embodiments disclosed herein.

FIGS. 4A and 4B show some variants of the disclosed apparatus. As shown, it is not necessarily the case that the lens array 4 comprises only a single series of lenses 6. Instead it may comprise a plurality of series of lenses 6, the different series being arranged parallel to one another (parallel axes). FIGS. 4A and 4B both show examples where the lens array 4 comprises a series of first lenses 6*i* and a series of second lenses 6*ii*, the first lenses 6*i* arranged along one axis and the second lenses arranged along another, parallel axis. In FIG. 4A the series of first lenses 6*i* is arranged along-side the series of second lenses 6*ii*, whereas in FIG. 4B the series of first lenses 6*i* is arranged end-to-end with the series of second lenses 6*ii*.

Either way, each series of lenses 6*i*, 6*ii* has a respective series of active elements 8*i*, 8*ii* disposed behind them. I.e. the apparatus comprises a series of first active elements 8*i* and a series of second active elements 8*ii*. In the first series, each first active element 8*i* is disposed behind a different respective first lens 6*i* in the series of first lenses. In the second series of active elements 8*ii*, each second active element 8*i* is disposed behind a different respective second lens 6*ii* in the series of second lenses. Everything described above regarding the relative placement between active elements 8 and lenses 6 within a given series may apply mutatis mutandis with respect to each of i) the series of first active elements 8*i* and its respective series of first lenses 6*i*, and ii) the series of second active elements 8*ii* and its respective series of second lenses 6*ii*. I.e. within the series of first active elements 8*i*, each is disposed at a different respective position relative to its respective first lens 6*i* in the direction along the axis of the series of first active elements 8*i*; and within the series of second active elements 8*ii*, each is disposed at a different respective position relative to its respective second lens 6*ii* in the direction along the axis of the series of second active elements 8*ii*. In other words, the series of first active elements 8*i* has a first set of spacings (e.g. a first pitch) and the series of second active elements has a second set of spacings (e.g. a second pitch).

The first set of spacings may be the same as the second set of spacings, or different. The series of first active elements 8*i* and series of second active elements 8*i* may both be series of transmit elements 8T, both series of receive elements 8R, or one may be a series of transmit elements 8T and the other a series of receive elements 8R. The second series may have the same number of active elements 8*ii* as the first series, or a different number. The addressing circuitry 7 may be arranged so that each active element 8*ii* in the second series can only be activated at the same time as a counterpart 8*i* in the first series at the same relative position, or alternatively the active elements 8*ii* in the second series may be addressable independently of the active elements 8*i* in the first series.

The lenses 6*i*, 6*ii* of both series are both fixed relative to one another within the lens array 4, such that when the actuator 2 moves the lens array 4 relative to the underlying active elements 8, the lenses 6*i*, 6*ii* of both series move in unison with one another relative to the active elements 8.

In embodiments, the series of first active elements may be configured to receive data on a different wavelength channel than the second active elements. The channels may be on exclusive wavelengths or spectral bands, or overlapping spectral bands. Preferably the difference or separation in wavelength is suitable to enable wavelength-division multiplexing of the two channels. However this is not essential, as alternatively (or additionally), spatial multiplexing may be used by steering the beams in different directions, or indeed other forms of multiplexing could be used such as time division or code division.

In other embodiments, both emitter and receiver elements 8T, 8R that operate at different wavelengths may be placed behind different lenses 6 of a single series of lenses, or even with a respective transmitting and receiving element 8T, 8R behind the same series of lenses (whether having a respective transmitter-receiver pair 8T, 8R behind each lens 6 in the series, or just behind a particular one or subset of the lenses). Such embodiments would have an advantage that crosstalk (from emitter to receiver element) can be reduced, e.g. by applying a filter on the sensor element to shield it from the emission of the near-by emitter element.

There are a number of possible applications of an arrangement having two (or more) series of active elements 8*i*, 8*ii* as in FIGS. 4A-B or similar.

In one such arrangement, the series of second active elements 8*ii* has a different set of spacings than the series of first active elements 8*i* (i.e. a different pitch). I.e. the set of offsets of the second active elements 8*ii* relative to their respective second lenses 6*ii* is different than the set of offsets of the first active elements 8*i* relative to their respective first lenses 6*i*. Also, both the series of first active elements 8*i* and the series of second active elements 8*ii* are transmit elements 8T, or both receive elements 8R. Further, the active elements 8*ii* of the second series are addressable independently of those 8*i* of the first series. This means the series of second active elements 8*ii* and their corresponding second lenses 6*ii* can be used to create a different set of beam directions. Thus the two series of active elements 8*i*, 8*ii* can be used to extend the angular range or increase the directional granularity of the beam steering in the first dimension. Or, in the case where the series of second lenses 6*ii* is arranged alongside the series of first lenses 6*i*, as in FIG. 4A, this allows for a more compact design for a given angular range or directional granularity. I.e. a greater angular range or granularity (in the first dimension) can be obtained from a given length of array 4 (the array being made wider rather than longer).

Figure 6:
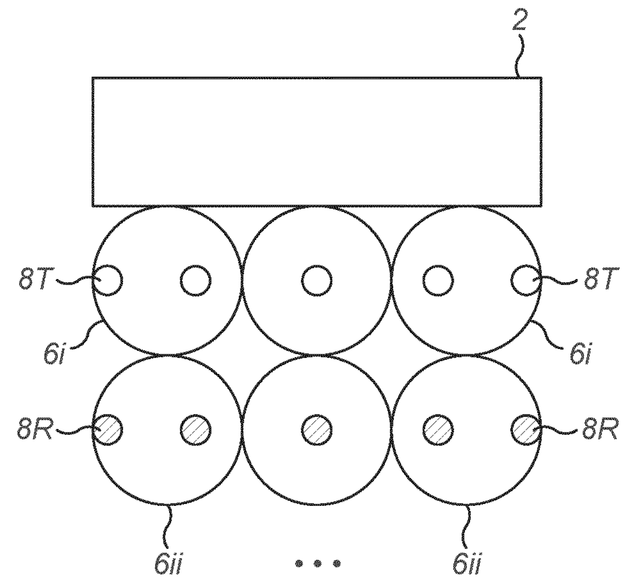
FIG. 6 is a schematic illustration of a variant of an optical beam-steering apparatus with both transmitting and receiving elements in accordance with embodiments disclosed herein.

In another example application, the series of first active elements 8*i* is a series of transmit elements 8T, and the series of second active elements 8*ii* is a series of receive elements 8R. Thus the first and second series 8*i*, 8*ii* can be used to form a transmit and a receive channel respectively. An example of this is shown in FIG. 6, to be discussed in more detail shortly. Or in another variant, the first and second series are both transmit elements 8T, or both receive elements 8R, but may be used to form first and second data channels for simultaneously transmitting or receiving a different sequences of bits or symbols.

In some such embodiments, the two series may also have the same number of active elements 8 as one another, and the series of second active elements 8*ii* has the same set of spacings as the series of first active elements 8*i* (i.e. the set of offsets of the second active elements 8*ii* relative to their respective second lenses 6*ii* is the same as the set of offsets of the first active elements 8*i* relative to their respective first lenses 6*i*). Further, the addressing circuitry 7 may be arranged such that each respective second active element 8*ii* is always activated and deactivated along with a respective counterpart in the series of first active elements 8*i* (where the respective second active element 8*ii* has the same offset relative to its respective second lens 6*ii*, along the axis of the series, as the counterpart first active element 8*i* does with respect to its respective first lens 6*i*). This means that when an active element 8*i* of the first channel is selected in order to steer the first channel's beam in a certain direction in the first dimension, then the counterpart second active element 8*ii* of the second channel will also be selected in order to steer the second channel's beam in the same direction in the first dimension (since that element 8*ii* has the same relative displacement compared to its respective second lens 6*ii*, along the direction of the axis of the series, as does the corresponding first active element 8*i* relative to its respective first lens 6*i*). Thus the beams of the transmit and receive channels, or the two data channels, will always be steered together to point in the same direction (bearing in mind also that they are moved together in the second dimension by the actuator 2).

Alternatively it is not excluded that the elements 8*ii* of the second series could be addressable independently of the series of first active elements 8*i*, such that the beams of the two different channels can be steered independently in the first dimension (though they will still move together in the second dimension due to being part of the same physical lens array 4 and moved by the same actuator). For instance the actuator 2 could be used to steer the beams towards a certain row of remote devices 14 (e.g. each located at a different one of a regular bank of desks), and then the pixel addressing may be used to steer individual beams towards different remote devices 14 within the row.

Figure 5A:
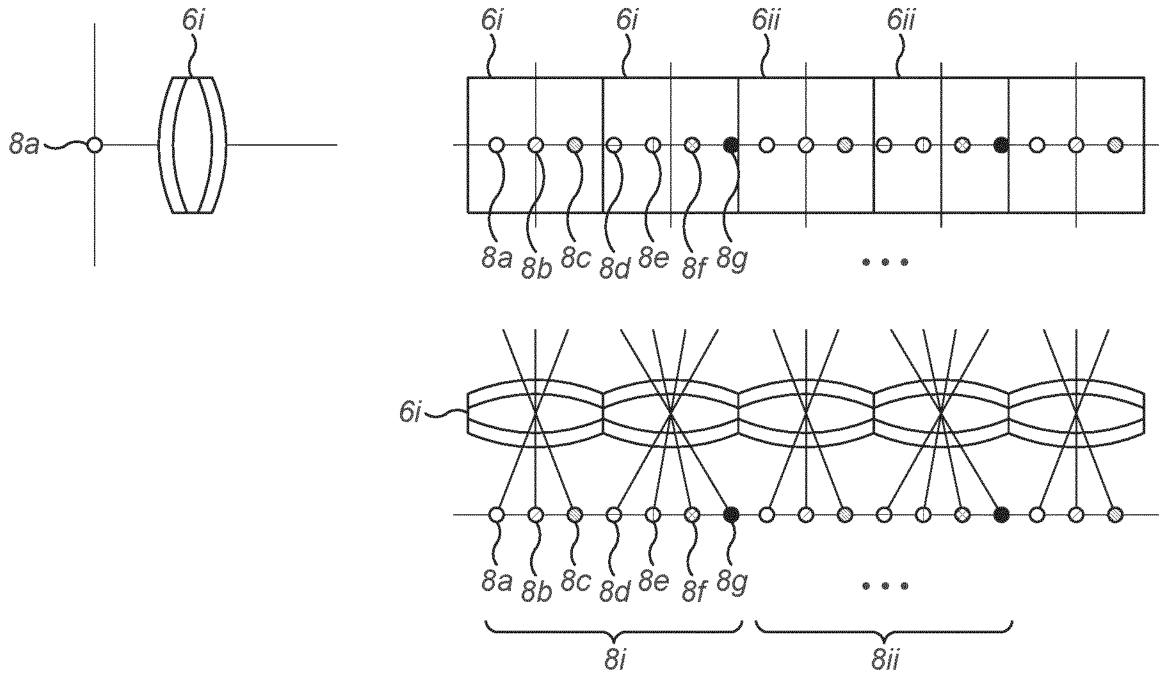
FIG. 5A is a schematic illustration of a variant of an optical beam-steering apparatus employing multiple active elements per lens in accordance with further embodiments disclosed herein.
Figure 5B:
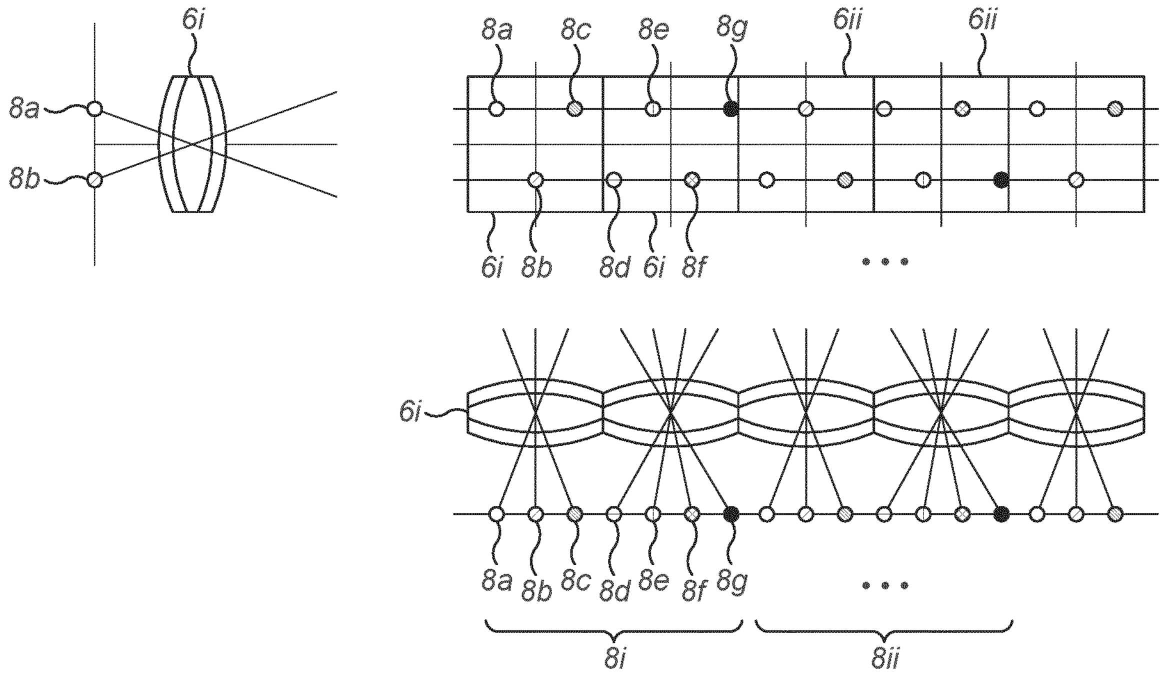
FIG. 5B is a schematic illustration of another optical beam-steering apparatus employing multiple active elements per lens in accordance with embodiments disclosed herein.

FIGS. 5A and 5B show some further variants of the disclosed beam-steering apparatus. These illustrate, by way of example, the idea that there need not necessarily be only one active element 8 behind each lens 6. In FIG. 5A, different active elements 8*a-g* within a given series are all arranged in a row or line, which in this case defines the axis of the series of active elements 8. There may also be multiple such series 8*i*, 8*ii* and their corresponding lenses 6. Within a given series 8*a-g*, the series may be considered as divided into a plurality of subsets, where each subset lies behind a different respective lens 6 than the other subset(s) in the series (and the elements within a given subset lie behind the same respective lens 6 as one another). At least one of the subsets comprises more than one active element 8, i.e. so there is more than one active element 8 per lens 6. In the example shown in FIG. 5A, one subset is formed of active elements 8*a-c* which are all behind one lens 6, and another subset is formed of active elements 8*d-g* which lie behind another lens 6. But it will be appreciated that this is just one illustrative example and there may be different numbers of lenses 6 within a given series than shown, and/or different numbers of active elements 8 (different sized subsets) behind each lens 6.

As illustrated by way of example in FIG. 5B, it is also not necessary that all the active elements 8 within a given series are all formed in a single row with one another. Instead the elements 8 of a given series may be divided among two (or more) parallel rows or lines. In such embodiments, any axis parallel to either row or line may be considered as the axis of the series. In the example shown, elements 8*a*, 8*c*, 8*e* and 8*g* form a first row; and 8*b*, 8*d* and 8*f* form a second row. Elements 8*a-c* form a first subset (behind one lens 6) and elements 8*d-g* form a another subset (behind another lens 6). In this kind of embodiment, every active element 8 has its own direction of emitted beam (in combination with the lens). That means, for n elements behind a lens, there are n possible beams that can be emitted (or received). These may cover a sub-set of the targeted angular space, and other combinations of active element 8 and lens 6 are used to cover the complementary part of the targeted angular space. This holds for both directions.

In either FIG. 5A or 5B, within a given subset each element 8 is disposed at a different respective position along the axis of the series, such that for a given lens 6, different beam directions can be achieved in the first dimension by addressing different elements 8 within the series of elements. These beam directions form a different subset of the total scan range of the apparatus. Embodiments such as those of FIG. 5A or 5B, or similar, thus provide another way to form a more compact design, i.e. to obtain a given angular scan range or resolution from a shorter lens array 4, or a larger angular scan range or resolution from a given length of lens array 4.

FIG. 6 illustrates an example comprising two series of active elements where the first series is a series of transmitting elements 8T behind a series of first lenses 6*i*, and the second series is a series of receiving elements 8R behind a series of second lenses 6*ii*. In this example the pitch of the series of transmitting elements 8T is the same as the pitch of the receiving active elements 8R. In the example illustrated, the pitch is such that within each series, some (but not all) of the lenses 6 have more than one active element 8 per lens. However that is not essential. Irrespective of this, if the receiving element 8R and transmitting element 8T at the same position along the axis of the array are both activated at the same time via the addressing circuitry, then the transmit and receive beams 10, 13 will be formed in the same direction so as to allow for duplex communication with the remote device 14.

Figure 8A:
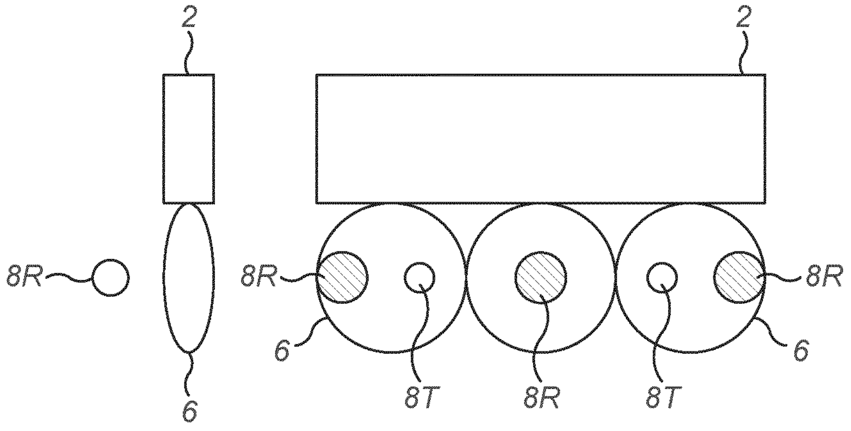
FIG. 8A is a schematic illustration of another optical beam-steering apparatus having both transmitting and receiving elements in accordance with embodiments disclosed herein.
Figure 8B:
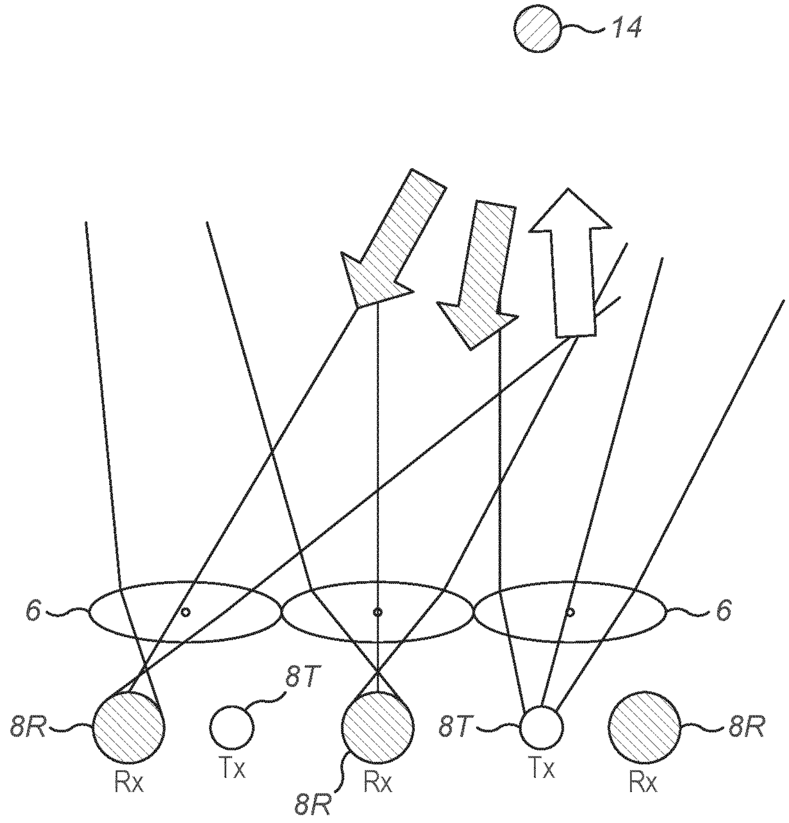
FIG. 8B is another schematic illustration of an optical beam-steering apparatus having both transmitting and receiving elements in accordance with embodiments disclosed herein.

FIGS. 8A-B show a possible variant where both the series of transmitting elements 8T and the series of receiving elements 8R are behind the same series of lenses. Note also that the pitch of the transmitting elements 8T does not necessarily have to be the same as the pitch of the receiving elements 8R.

In embodiments such as those of FIGS. 6 and 8A-B, which comprise both a series of transmitting elements 8T and a series of receiving elements 8R, it is also possible to use the receiving elements 8R to steer the transmit beam 10 toward the remote device 14. In this case, the controller 9 is configured to detect which of the receiving elements 8R is currently receiving the strongest signal 12 from the remote device 14. For example the controller 9 may scan through all the receiving elements 8R in the series of receiving elements, or temporarily activate them all at once. Once the controller 9 has determined which receiving element or elements 8R receive(s) the strongest signal, then based on this, it selects the corresponding counterpart transmitting element(s) 8T to use to transmit a signal toward the remote device. Or if each receive element 8R does not have an exact counterpart transmit element 8T at the same position along the axis of the series and lanes array 4 (e.g. as in FIGS. 8A-B), then the controller 9 may select a closest one or more transmit element or elements 8T to use to transmit to the remote device 14 (i.e. closest to the receive element 8R detected to receive the strongest signal). Thus the controller 9 can tune the direction of the transmit beam in the first dimension to track the direction of the remote device 14.

Figure 7:
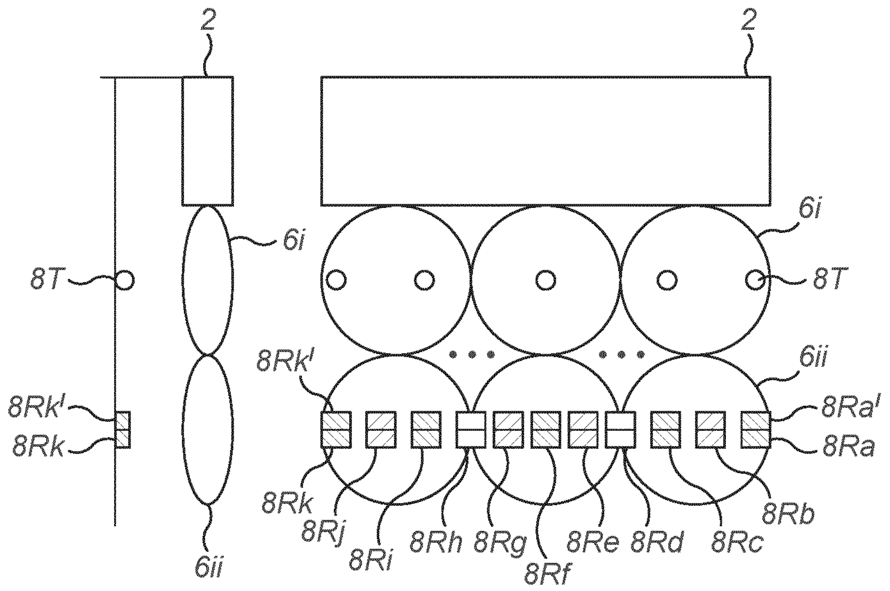
FIG. 7 is a schematic illustration of another optical beam-steering apparatus having both transmitting and receiving elements in accordance with embodiments disclosed herein.

FIG. 7 illustrates, by way of example, a possible refinement of schemes such as those of FIGS. 5 and 8A-B for tracking the direction of the remote device 14. Here the series of receive elements 8R comprises a relatively finely space subset 8Ra, 8Rb, 8Rc . . . of receive elements 8R behind each receiving lens 6*ii*—more finely or densely spaced than the transmit elements 8T are spaced behind their respective lenses 6*i*. Such designs allow for relatively fine-grained tracking of the direction of the source 14 in the first dimension.

Alternatively or additionally, the apparatus may comprise two (or more) parallel rows or lines of receive elements 8R, 8R'. The elements 8R, 8R' in each row are still each behind at least one of the lenses 6*ii*. However, the different rows are located a different offsets in the direction perpendicular to the axis of the series of lenses 6, offset in the direction of (relative) motion of the lens array 4 by the actuator 2. Such an arrangement can be used to track the direction of the remote device 14 in the second dimension. In such embodiments, the controller 9 detects which of the receive elements 8R, 8R' is currently receiving the strongest signal from the remote device 14—including in which row that element is found. Based on this, the controller 9 then controls the actuator 2 to move the lens array 4 relative to the active elements 8T, 8R, 8R' and thus tune the direction of the transmit beam 10 in the second dimension so as to be directed toward the remote device 14.

In the illustrated embodiment of FIG. 7, each receiving element 8R has a counterpart 8R' at the same position along the series but a different offset perpendicular to the series. The comparison of received signal strength may be made between one of the receiving elements in one row and its counterpart in the other row. However, this is not essential and a receiving element 8R could be compared with an offset element 8R' located behind a different lens 6, and/or with a different position relative its respective lens that lens.

Further variations and example implementations of schemes for tracking the remote device 14 will be discussed later with reference to FIGS. 10 to 14.

Figure 9:
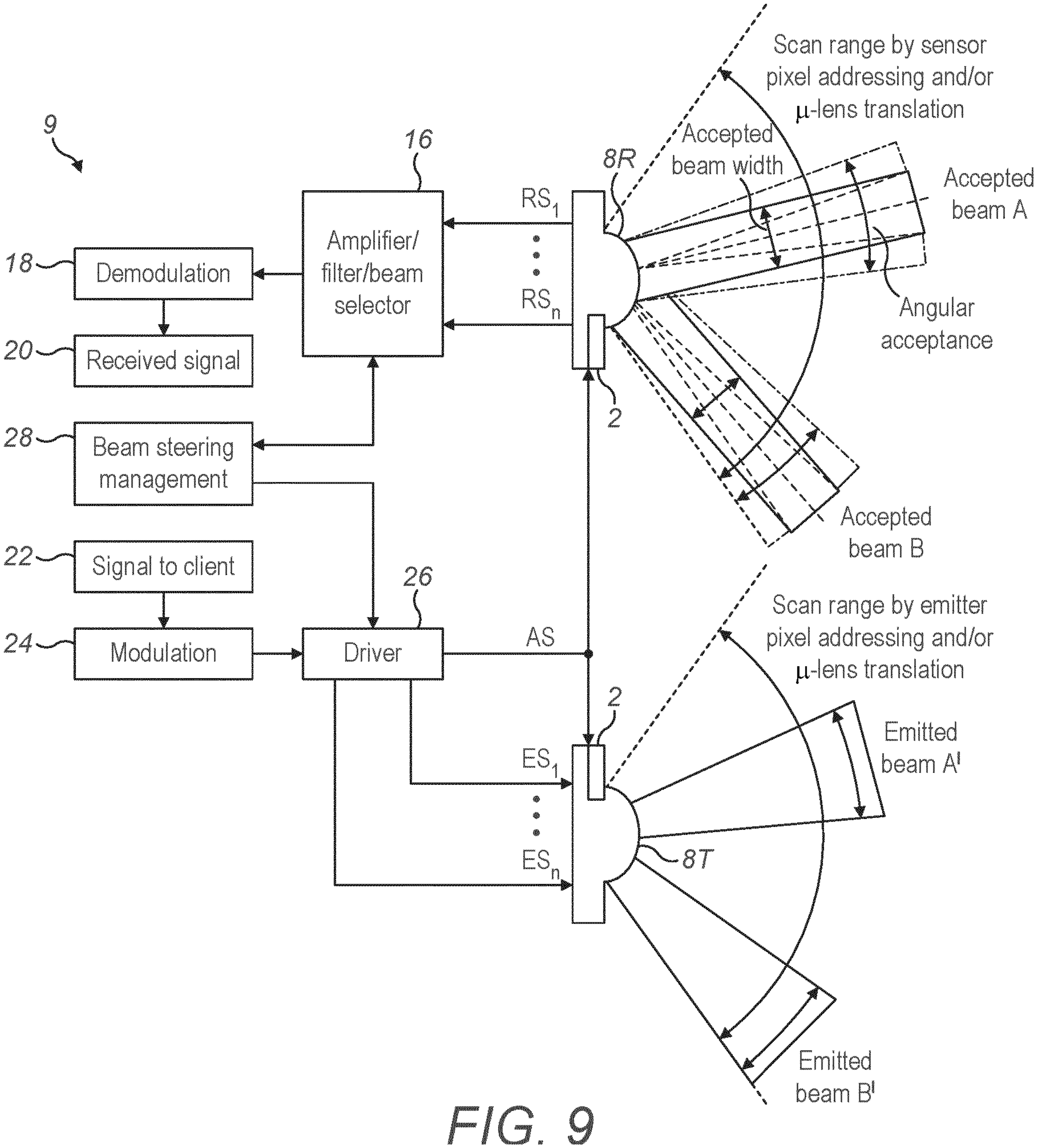
FIG. 9 is another schematic illustration of an optical beam-steering apparatus having both transmitting and receiving elements in accordance with embodiments disclosed herein.

FIG. 9 schematically illustrates some example details of the controller 9 in an embodiment with both transmit and receive elements 8T, 8R. In the receive path the controller 9 comprises an amplifier, filter and beam selector module 16; and a demodulator 18. In the transmit path the controller 9 comprises a modulator 24 and a driver 26. The controller 9 also comprises a beam steering management module 28. Each of these modules 16, 18, 24, 26, 28 may be implemented in software stored in one or more memory units and arranged to run on one or more processors; or alternatively in dedicated hardware circuitry; or configurable or reconfigurable circuitry such as a PGA or FPGA; or any combination of software and hardware.

The amplifier, filter and beam selector module 16 is coupled to the receive elements 8R via the addressing circuitry 7 (not shown in FIG. 9 but will be understood to be present). For illustrative purposes only one receive element 8R is shown in FIG. 9, but others will be understood to be present. The amplifier, filter and beam selector module 16 is coupled to the demodulator 18, and the demodulator 18 is coupled to the beam steering management module 28. The driver 26 is coupled to the transmit elements 8T via the addressing circuitry 7 (again not shown in FIG. 9). For illustrative purposes only one transmit element 8T is shown in FIG. 9, but others will be understood to be present. The driver 26 is coupled to the modulator 24, and the modulator 24 is coupled to the beam steering management module 28. The beam steering management module 28 is also coupled to the actuator 2. Note again that this is a schematic representation showing functional blocks, and in practice the arrangement may be implemented by either one actuator 2 (which then moves both the receiver lens array and the emitter lens arrays relative to the receiver and emitter arrays), or implemented as by two (as indicated) or more separate actuators 2.

In operation, the beam steering management module 28 selects which receive element 8R to use to receive a signal from the remote device 14. In response the amplifier, filter and beam selector module 16 uses its beam selection function to activate the selected element 8R via the addressing circuitry 7. The amplifier, filter and beam selector module 16 then uses its filtering and amplifier capability to filter and amplify the signal received at the selected receive element 8R, and pass the resulting signal to the demodulator 18. The demodulator 18 demodulates this to produce a demodulated received signal 20.

The beam steering management module 28 selects which transmit element 8T to use to send a signal to the remote device 14. In embodiments this may be done based on which receive element 8R is selected to best receive from the remote device 14, as discussed earlier. Either way, in response, the driver 26 selects to activate the selected transmit element 8T via the addressing circuitry 7. The modulator 24 modulates the desired signal 22 to be transmitted, and passes it to the driver 26 to transmit via the selected transmit element 8T.

While the above has been described in terms of embodiments where the motion effected by the actuator 2 is perpendicular to the axis of the series of lenses 6 in the lens array 4, this is not limiting. In alternative embodiments the motion may instead be parallel to the axis of the series of lenses 6 (or to the axes of parallel lens series), whilst different active elements 8 may be arranged at different positions behind a given lens 6 in a direction perpendicular to the axis of the lens series. Thus pixel addressing by the addressing circuitry 7 would steer the beam in a plane perpendicular to the axis of the lens series, whilst the actuator 2 would steer the beam in a plane parallel to the axis of the lens series.

Figure 15:
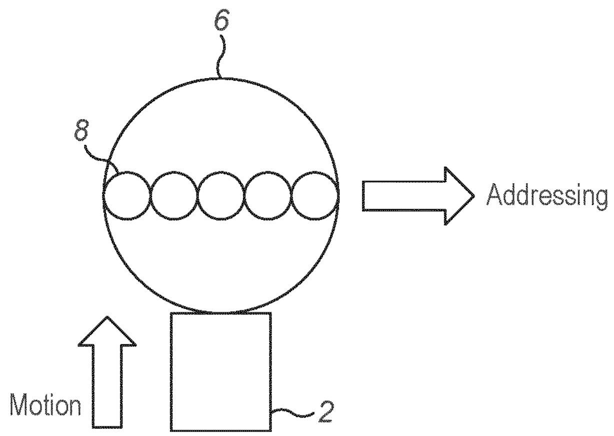
FIG. 15 is a schematic illustration of an alternative optical beam steering apparatus in accordance with embodiments disclosed herein.

In a further variant, only a single movable lens 6 may be used, with a series of two or more active elements 8 behind the lens 6. In this case the actuator 2 would cause relative motion of the lens 6 in one direction, while the series of active elements would be aligned along another, perpendicular direction. An example of this is shown in FIG. 15, Alternatively or additionally, in yet further variants the relative motion between lens(es) 6 and active elements 8 need not be absolutely perpendicular to the series of active elements. More generally, the relative motion between lens(es) and active elements 8 may merely be non-parallel to the series of active elements (the motion having at least a perpendicular component compared to the axis of the series of active elements 8). For example one could have a configuration of a linear array of active elements and a collinear array of lenses, but with their axis not perpendicular to the actuator movement (but, e.g. with an inclination of 45°). This also works just as the orthogonal cases, as long as the offset of the active elements relative to the lens elements is in a direction perpendicular to the actuator to make both beam steering directions independent from each other.

Figure 16:
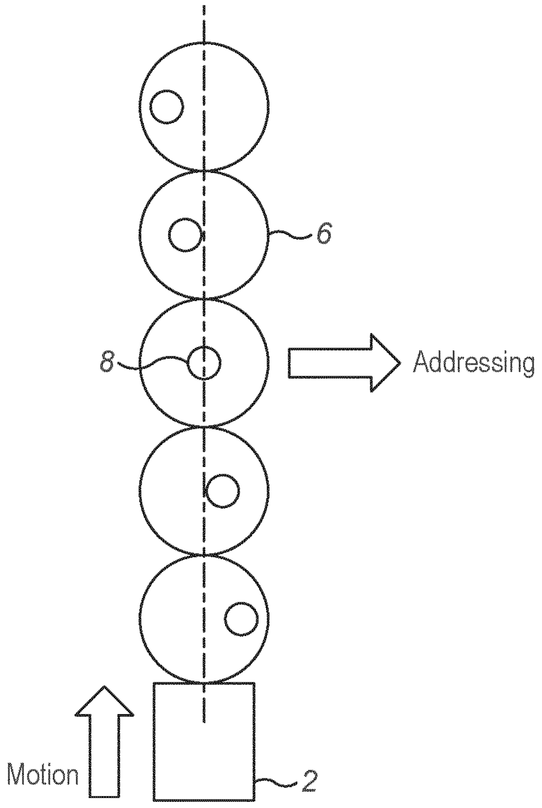
FIG. 16 is a schematic illustration of another alternative optical beam steering apparatus in accordance with further embodiments disclosed herein.

Or in yet another variant, the series of lenses 6 may be parallel to the direction of movement, and the active elements 8 may also be placed almost parallel along the direction of movement (e.g. one active element 8 behind each lens 6), provided that that the offset of the active elements relative to the lenses is not parallel to the direction of movement. An example of this is shown schematically in FIG. 16.

The following now describes in more detail some example implementation details for implementing the techniques disclosed herein.

Embodiments provide a 2D steerable optical beam emission and/or detection configuration for LiFi communication. The system comprises a linear array of electro-optic or opto-electric elements (the "active" elements that can be light sources and/or photo detectors) and a linear microlens array, where the pitch in the array of the active elements and in the array of the microlenses are different. Furthermore, the microlens array is moveable by means of an actuator, preferably an electromechanical (e.g. piezoelectric or bimorph) or electromagnetic actuator. Thanks to the different pitch of the lens elements and the active elements, these combinations of the various active elements and the corresponding lens elements result in different direction of optical beam emission or reception. Therefore, scanning in one direction is possible by means of pixel addressing of the active element array. The lens array is moveable in a direction substantially perpendicular to the direction in which the beam is pixel-addressed steerable. By moving the position of the lens elements relative to the active elements, the direction of emission/reception is steered in a plane coinciding with the axis of the mechanical translation. Therefore, the mechanical translation corresponds with beam steering in a direction substantially orthogonal to that of the pixel-addressed steerability. By combining the lens array translation with pixel-addressing of the active elements array, 2D directional steering of an emitted optical beam or of a received optical beam is realized. In embodiments, the combination of both provides an ideal way to set identical selection of the incoming and emitting directional beams. In embodiments the steering may comprise systematically scanning across two dimensions, e.g. to search for an incoming beam 12.

In LiFi systems, electromagnetic radiation in the visible or near infrared (NIR) part of the spectrum is high-frequency modulated to transmit data at a high data rates. In earlier commercial systems, for the downstream link data flows from one or several electro-optical emitters comprised in an access point (AP) in the ceiling (e.g. integrated in a luminaire) via a wide beam of modulated radiation to a receiver at the location of an end-user or end point (EP). This receiver is typically a dongle that is connected via a USB interface with a computer. For the upstream link, an electro-optical emitter located in the dongle emits a wide beam of modulated radiation that in turn is received by one or more opto-electrical sensors in the access point in the ceiling. Most light detectors are based on a photodiode provided with an optical element to concentrate the light. The optical beams are generally very wide and detection under larger angles becomes increasingly difficult due to strongly reduced optical power detection with increasing angles. It would be desirable to reduce the power consumption, to increase the coverage area, to reduce interference and/or to increase the end user density, i.e., the number of connections between APs and EPs.

Increase of the EP density without compromising the link speed per EP would require an increase in power consumption and in emitted optical power in the current LiFi systems. Both are undesirable, both from a sustainability and competitive point of view as well as from an eye safety point of view. In addition, the current systems do already consume too much power and need a significant power reduction to enable large-scale adoption. A solution for these issues is the use of directional beams. Flexibility requires that such directional beams can be scanned across a range of directions. In addition, a directionally sensitive detection system would be desirable to determine in which direction a directional beam is to be emitted. Beam steering using a 2D scanning mirror is known. However, the scanning range is very limited. Also source segmentation is known, enabling addressing of various beam segments. However, for multiple segments and a compact configuration of the source pixels, as required for miniaturized components, addressing the pixels in a 2D arrangement is difficult without applying a complex stack of active elements on top of a CMOS chip for vertical addressing.

The present disclosure describes a system that delivers a directional beam with 2D directional steering and scanning capability, as well as a system that provides directionally sensitive detection of incoming optical beams, enabling low-power operation of such LiFi systems, while enabling easy access to the various active elements. In addition, embodiments provide for setting the identical direction for both the incoming and the outgoing optical beams.

2D step-wise scanning of the direction of an optical beam, either emitted from an electro-optical element such as a vertical cavity surface emitting laser (VCSEL) or received by an opto-electrical sensor element such as an avalanche photodiode (APD), may be realized by selectively addressing of one or more active elements out of a 2D array of multiple of such active elements. However, addressing of the elements in a dense 2D array is problematic. Alternatively, a single active element may be used by combining this with a 2D scanning mechanism that changes the relative position of the element and a beam shaper such as a lens. However, miniaturization and functionality of such 2D scanning mechanism is problematic.

The present disclosure provided a configuration in which a linear array of active electro-optical or opto-electrical elements, of which the individual elements can easily be addressed, is combined with a microlens array that can be linearly translated by an actuator in a direction substantially perpendicular to the array. The pitch of the active elements differs from that of the microlens array. As a result, by selectively addressing of one or more elements of the linear array of active elements, the associated optical beam can be step-wise steered in a direction determined by the arrays. By translating the microlens array by means of an actuator, such as a piezoelectric actuator, the optical beams associated with the active elements can be steered in the direction determined by the mechanical translation of the microlens array. Combining the selection of one or more of the active elements with selecting a certain translation position of the microlens array results in selection of a specific beam direction in a 2D angular phase space and enables active steering of one or more optical beams. This beam is either an emitted optical beam, in case of an array of electro-optical active elements, or an optical beam that is detected, in case of an array of opto-electrical active elements.

This principle is schematically depicted in FIGS. 1A and 1B. As discussed earlier, this gives a schematic graphical representation of an array of opto-electric or electro-optic active elements 8 provided with a (micro)lens array 4 that can be translated relative to the active elements 8 by an actuator 2 to steer the optical beams associated with the various active elements in the direction of translation, wherein the pitch of the active elements 8 and the lenses 6 is different such that the optical beams associated with the active elements 8 vary in the direction of the arrays.

This beam steering may be used for one or more emitting beams, for one or more receiving beams, or for a combination of one or more emitting and receiving beams. In the latter case the two systems as described above are combined, either each with their own actuator or using a single actuator.

The disclosed configuration of active elements 8 and lens array elements 6 enables the 2D quasi-continuous steering of an emitted light beam or angular-specific detection of an incoming light beam.

FIG. 1B gives a schematic representation of a quasi-continuous 2D beam steering device for wireless optical communication. Illustrated are the top view and two orthogonal side views of the device comprising a linear array of active electro-optic of opto-electric elements 8 and a linear array 4 of micro lenses 6 positioned above the array of active elements and mounted to an actuator 2. The top and side views indicate various positions of the micro lens array 4 as resulting from different states of the actuator 2 by which the lens array is translated in a direction perpendicular to the direction of the lens array.

The active elements 8 in the linear array may be electro-optic elements such as light emitting diodes (LEDs), super luminescent emitting diodes (SLEDs), vertical cavity surface emitting lasers (VCSELs), photonic crystal surface emitting lasers (PCSELs), or edge-emitting laser diodes (EELDs). A lens array 4 is mounted movably collinear with and above the active elements array.

Using a different pitch for the elements 8 in the active elements array and for the lenses 6 in the lens array 4, the light beams associated with the various active elements with their related lenses vary in direction in a plane coinciding with the axis of the arrays. Selected activation of an electro-optic (or opto-electric) element 8 means, therefore, that one can step-wise steer the beam in one direction.

For steering the beam in a direction perpendicular to that, i.e. perpendicular to the arrays, the lens array 4 is translated by an actuator 2, as indicated in FIG. 1B, in the direction perpendicular to the lens array. The actuator 2 may be, e.g., a piezoelectric actuator or an electromagnetic actuator. For instance for very small active elements such as VCSEL emitters, with diameters of the emitting surface area in the range of several µm to several tens of m, a piezoelectric actuator may be suitable as only small translations of the lenses are needed to achieve large beam redirections. Therefore, with these actuators in this direction the beams may be steered continuously.

For electro-optic elements, positive lenses may be used to both shape and direct the beam emitted from the system, where the focal distance and the actual distance from emitter to lens determine the final beam divergence. This is shown schematically in FIGS. 2A-B, where the collimating lenses are used to create diverging beams.

FIGS. 2A-B show cross-sectional views of a 2D steerable optical beam emitting device according to embodiments. FIG. 2A shows the different relative orientations of the light emitting elements 8T and lenses 6 and the resulting emitted light beams 10 upon activation of different light emitting elements, respectively. FIG. 2B shows the variation of the relative positions of lenses 6 and light emitting elements 8T by different states of the actuator 2, and the resulting emitted light beam 10 upon activation of a light emitting element, respectively.

As the beams from adjacent emitter elements are preferred to partly overlap with each other, the beams are designed with the required divergence, related to the steps in angular resolution of this step-wise steerable beam. FIG. 2A shows two resulting emitted beams 10A, 10B upon activation of these two elements. The steering in the direction perpendicular to the element array is realized by translating the lens array relative to the emitter elements array, and the resulting direction of the emitted beams, for a certain position of the lens array, is shown in FIG. 2B.

In alternative embodiments, other configurations and implementations of active element and lens combinations, and of lens elements, may be used, for example as follows.

Square or rectangular lens elements rather than round lens elements, enabling steering in a square or rectangular area.

Negative (diverging) rather than positive (collimating) lenses; these can be used to create diverging emitted light beams, but are not preferred for a receiver array of opto-electric elements.

Multiple arrays of active elements placed next to each other in combination with multiple arrays of lenses next to each other where beam directions may or may not be repeating.

Multiple sub-arrays mounted sequentially as a single long array, where beam directions may or may not be repeating.

FIG. 4A shows dual-array configurations, and FIG. 4B shows linear sub-array configurations.

Other possible embodiments include:

hexagonal lens elements with lenses on a hexagonal grid;

other permutations of combinations of lens arrays and/or (offset) positions of the active elements relative to the lens element optical axes;

planoconvex or planoconcave lens shapes may be preferred over biconvex or biconcave lens shapes;

multiple active elements associated with a single lens element;

translation of the lens array in the direction of the lens array in combination with displacements of the active elements in a direction perpendicular to the lens translation (or the orientation of the array of active elements); and/or non-circularly symmetric beam shapes, e.g. square, rectangular, hexagonal, or oval beam shapes.

For receiver elements, the objective is to achieve angularly resolved sensitivity 13 and to improve speed as well as signal-to-noise ratio (SNR) by condensing received light on small opto-electric receiver elements 8R. Suitable elements 8R may be phototransistors (PT's), PiN photodiodes (PDs), avalanche photodiodes (APDs), photomultipliers (PM's), etc. The concept is very similar to what has been described above for an emitted beam, but in this case for an incoming light beam that is to be detected, a certain fraction of it is actually received by a sensor element 8R. This is determined by the effective light receiving surface area, the direction of the incoming beam, the size of the sensor element and the relative position of the lens 6 and the active sensor element 8R. By design, a certain angular extent of the sensitivity of each sensor element and lens combination 8R, 6 is realized such that these "sensitivity cones" 13 show a certain degree of overlap for adjacent sensor and lens combinations. In the direction perpendicular to the arrays, the beam steering (or scanning) may again be continuous thanks to the possibility to steer the actuator 2 continuously. This angular resolved beam reception 13 as described above is depicted schematically in FIGS. 3A-B.

FIGS. 3A-B show cross-sectional views of a 2D steerable optical beam receiving device according to embodiments. FIG. 3*a* shows how different relative orientations of the sensor elements 8R with respect to their associated lenses 6 result in received light beams 12 (e.g. 12A, 12B & 12C) upon addressing the different light sensing elements 8R, respectively. FIG. 3B shows the variation of the relative positions of lenses 6 and light sensing elements 8R by different states of the actuator 2, and the resulting receive beam 12 upon addressing of a light sensing element for a particular state of the actuator 2.

In the embodiments of FIGS. 1 to 4B, a single active element 8 was associated with a single lens 6 (e.g. single element of a microlens array). However, by combining multiple active elements 8 per lens and using the principles as described above, the system can be made more compact. Using e.g. n active elements 8 per lens 6, the physical array length of both the active elements array and the lens array can be reduced by a factor n. Example embodiments of such configuration are depicted schematically in FIGS. 5A-B.

FIGS. 5A-B give schematic representation of some example embodiments comprising multiple active elements 8 per lens element 6. FIG. 5A shows a single linear array with a combination of three and four active elements 8 per lens 6. FIG. 5B shows a double linear array on a hexagonal grid with three and four active elements 8 per lens 6. Other configurations are also possible, e.g. triple linear array on a hexagonal grid with ten or with ten and eleven active elements per lens. Different active elements 8*a-g* and beam directions as shown in FIGS. 5A-B represent projected beam angles. The bottom part of FIG. 5A shows the projected beam angles on a plane through the axis of the lens array 4 and perpendicular to the plane of the active elements 8, and the active elements that correspond with these projected beam angles. The left part of the drawing shows the projected angles in a perpendicular plane. These embodiments enable more compact systems, as multiple active elements 8 are combined with a single lens 6, while these elements still can be easily individually addressed from the two sides Based on the disclosed emitter and sensor systems, it is also possible to provide an optical radiation sensing and emitting unit that combines these features, e.g. that emits a beam of modulated optical radiation with a solid angle subtended of less than 60%, preferably less than 30%, most preferably less than 20%, of the viewing solid angle of the sensor system in a direction that is determined directly from the detected optical powers by (groups of) sensor elements 8R. This may be realized by combining a sensing unit and an emitting unit as described above, or these systems can be further integrated by using only a single actuator 2 for the lenses that steer the emitted beams and for the lenses that determine the directional sensitivity of the sensor element—lens combination as well. This integrated scenario may be implemented for example as schematically depicted in FIG. 4A in the case where the first active elements 8*i* are transmitting elements 8T and the second active elements are receiving elements 8R.

This may be used to provide a receiver-emitter system for LiFi with linear sensor and emitter pixel arrays and translatable microlens arrays for the emitter and for the sensor pixel arrays. As discussed previously, the different active elements 8 have different relative component positions for a given actuator status, while orthogonal position variations are achieved upon variation of actuator settings. The direction of emission is based on the selected emitter pixel(s) and actuator setting (i.e. position of the lens array), while the directional sensitivity of the receiver is set by the selected sensor pixel and the same actuator setting.

In further embodiments, lenses 6 in receiver-emitter systems may be used for both multiple emitter elements 8T and for multiple sensor elements 8R. This is particularly attractive if the active elements 8 can be placed closely together. An example of five active elements 8 under three lenses 6 is shown in FIG. 6. Elements 8T dots indicate emitters. Elements 8R indicate detectors.

An alternative embodiment is depicted in FIG. 7. This involves sharing lenses 6 by multiple active elements 8R, 8T. It may also involve a larger number of emitters 8T than shown. In this example of a steerable emitter-receiver, the system comprises multiple active elements 8 per lens 6, among which pairs of detectors 8R, 8R' enable directional tracking and optimization of the direction of maximum emission and reception in the direction of movement of the actuator 2. Multiple pairs of detectors 8R, 8R' enable directional tracking and optimization of the direction of maximum emission and reception in the direction of the lens array 4 and the array of pairs of detectors.

Considerations in this design are an optimisation of using the receiving area as optimally as possible. Therefor the photodetector (PD) elements 8R are as densely as possible packed along the center line on which the detector lenses 6*ii* are aligned. Electronics for read out, such as Transimpedance Amplifiers (TIAs) can be located next to the detectors, this very nearby to avoid parasitic effects in the wiring, and allow as dense as possible the packing of the photo sensitive areas. At each location, two PDs 8R, 8R' are placed next to each other, such that these show a different sensitivity to light coming from slightly different angles of incidence in the dimension in which the mechanical actuator 2 can steer the beam, and, therefore, can steer the sensitivity. Hence, a control signal can be derived by comparing the strength of the signal in each PD of such a pair. If the light falls predominantly on the PD that is closest to the actuator 2, the unit may be moved further out such that relatively more light falls on the outer PD. The controller 9 is preferably is configured to ensure that an equal amount of light falls on the inner and outer PD 8R, 8R'. This may be done for a specific subset of the PD pairs or for by combining the signals of all inner and all outer PDs and subtracting the joint inner from the joint outer signal.

In the particular example shown, five pairs of PDs (8Ra, 8Ra'; 8Rc, 8Rc'; 8Rf, 8Rf'; 8Ri, 8Ri'; 8Rk, 8Rk') detect light respectively coming from extreme left, moderate right, centre, moderate left and extreme right. This would be for positive (condensing) lenses as illustrated in the drawings. For negative (diverging) lenses the order would be the opposite. Thereby these sensor pairs see light that corresponds to the direction in which the emitters 8T can respond in a bidirectional link. Although the system can be used for a single user, up to five parallel channels could be used if counter stations happen to be in different sectors and aligned along a direction such that all received signals are optimum for the same position of the lens array actuator. In addition, signals captured by other pairs of PDs (8Rb, 8Rb'; 8Re, 8Re'; 8Rg, 8Rg'; 8Rj, 8Rj'), can be added to further contribute to particular receiver sectors and can be added to the signal from the first-mentioned five pairs of PDs (8Ra, 8Ra'; 8Rc, 8Rc'; 8Rf, 8Rf'; 8Ri, 8Ri'; 8Rk, 8Rk'). Alternatively or additionally, elements 8Rd, 8Rd'; 8Rh, 8Rh' may be added to correspond with the largest angles of incidence, not covered by the other elements 8Ra, 8Ra'; 8Rc, 8Rc'; 8Rf, 8Rf'; 8Ri, 8Ri'; 8Rk, 8Rk'. As these are positioned at the interface between two lenses 6, and if there is no optical block between the lens-sensor segments, then elements 8Rd, 8Rd'; 8Rh, 8Rh' can only be used to determine the absolute angle of incidence, but not whether that comes from the left or from the right. If there are no emitting elements 8T positioned such that they can emit a beam in this direction, then these sensor elements may just be used to have a somewhat larger overall field of view (field of regard) than the overall field of emission of transmitting elements 8T, or to activate the emitters that would point most closely to that direction. For the determination whether the beam comes from left or right, signals from other (neighbouring) sensor elements would be required as well.

In further embodiments, emitters and detectors may share the same lens. An example of such an embodiment is schematically indicated in FIGS. 8A-8B. This system has three detectors 8R, two emitters 8T and three lenses 6. This is an example of a steerable emitter-receiver system comprising lenses 6 that share both sensor and emitter elements 8R, 8T. FIG. 8A shows a top and transversal side view. FIG. 8B shows a longitudinal side view with indication of emitting and receiving light rays as well as the relative position of the counter station (remote device) 14 to communicate with.

For most incoming angles, two detectors 8R may capture the signal, thereby making more effective use of the total optical opening (which is the union of all lenses 6 and their motion area). In this special case, two emitters 8T cover the reception area in the form of having two sectors, while the detectors 8R receive signals from three sectors but with large overlap. Such overlap has two benefits: (I) a direction can be determined from the relative strength of the signals in the sectors and (II) if the signal arrives in more than one sector, these sectors can be combined to enhance the signal-to-noise ratio, or, in other words, to increase the effective aperture via which the receiver sees incoming photons. The received signal consists of the addition of the signal seen in the centre detector and the signal in one of the two side detectors. The signal strength in the left detector minus the signal strength of the right detector can be used as a control signal that determines which detector to add, but also for which emitter to use to communicate with the counter station 14.

For a wireless communication system, or module, with the optical beam emitting and receiving units as described above, the various sensor element outputs are preferably amplified and filtered to facilitate selection of elements corresponding with a direction of incidence that is to be selected and to further process the selected signal, i.e., to demodulate the signal for further downstream processing. Preferably, for detection of active elements 8R that are receiving signal, low pass filtering is applied, with the filter edge at e.g. 1 MHz, to enable high sensitivity, which typically is combined with high pass filtering at some lower frequency to eliminate background signals, while for the further amplification and demodulation of a selected signal high pass filtering may be applied with the filter edge at e.g. 1 MHz. As the selected direction of the sensor sensitivity is determined by both the selection of the sensor element(s) 8R and the actual position of the lens array 4, i.e., the actuator status, beam steering management 28 may be employed to coordinate the selection and setting of to be received and to be emitted optical beams. This beam steering management 28 communicates with both the receiving signal electronics 16 and the driver 26. The driver 26 receives the modulated signal that is to be emitted and provides the drive current(s) to the selected emitter element(s) 8T as well as the actuator signal to set the lens array 4 in the right position. Such a system is schematically depicted in FIG. 9.

FIG. 9 gives a schematic representation of an optical wireless communication apparatus comprising a steerable optical beam emission unit and a steerable light beam sensing unit. The apparatus comprises a signal processing unit comprising signal (received signal $RS_i$) amplification, filtering, beam selection 16 and demodulation 18 for the light receiving channel; beam steering management 28 for both light reception and light emission; modulation 24 for the currents to be sent to the emitters 8T; and a driver 26 that provides the drive current (emitted signal $ES_i$) to selected emitting elements 8T and a drive signal to the actuator(s) 2.

The figure shows schematically the receiving unit, that comprises the sensor element array 8R with the actuator 2 and the lens array 4 for the receiving beams as described above, and the by the receiving unit accepted parts of two different incident beams A and B. The received signals $RS_1$ to $RS_n$ of the sensor array, which may correspond with n or an integer multiple of n sensor elements 8R, are amplified and filtered, and a selection of to be further processed signals is made before that signal is demodulated for downstream processing. Beam steering management 28 determines what settings are to be used for the actuator 2, that is fed with an actuator signal AS. In case of discrete receiving and emitting units this signal is sent to the two corresponding actuators 2, or two separate signals are used to achieve the correct corresponding lens positions. In case the receiving and emitting units are further integrated there may be only a single actuator 2. The driver 26 further can provide the modulated drive currents comprising the emitter signals to a subset of one or more of the emitter elements, $ES_1$ to $ES_n$. The beam steering management 28 determines which emitter elements are to be addressed, i.e., to which emitter elements 8T modulated drive signals are sent. This results in emission of a beam that is substantially in the same direction as from where the incident beam has been received. The figure shows these emitted beams A' and B' that correspond with the detected incoming beams A and B.

The systems are preferably configured such that the beams corresponding with two adjacent beam directions show a certain degree of overlap to prevent dead zones or signal loss when switching from one beam direction to the other.

In alternative embodiments, an additional directionally sensitive optical sensor, such as a quadrant detector with appropriate optics, may be used to determine the direction of incidence of an incoming optical beam. In that case there is an additional input to the beam steering management 28. The frequency response of this detector is preferably chosen far lower than for the signal detection, enabling highly sensitive directional detection. Preferably the f3 dB, i.e., the modulation frequency at which the sensor response falls by 3 dB, of this directional sensor is less than 10% of that of the signal sensor.

In embodiments, the system may scan for presence of an optical signal incident from a certain direction. Once detected, the angular direction of the position of the emitting point 14 is known and a narrow beam can be emitted towards that point. The narrower this beam, the less energy is required, but also more accurate directional sensing and pointing of the emitted beam will be needed. Typically, the emitted beam width is comparable or larger than that of the received (accepted) incoming beams to prevent that the targeted node 14 is missed, as generally it may not be known where exactly that node is other than that it's somewhere in the received angular beam width. The angular step from one beam direction to the next one, in case of variation of the relative positions/directions of the two LINK nodes, needs to be smaller than the width of the beam to ensure continuous connection. The overlap is preferably at least ca 10%. With a quad detector, the angular space can be split into four segments or more (depending on the accuracy of the detector), and the solid angle subtended by the emitted beam of the end node can be less than 30% of the sensor's FoV. Preferably the sensor's accuracy in determining the angular relative position of the AP is such that the solid angle subtended can be less than 10% of the FoV, meaning that for identical data speed the optical power requested for the emitted beam is reduced by a factor of ten. In this case the uplink beam overlaps only with the targeted node 14, and interference effects are therefore reduced.

The following now describes in more detail some example implementations of detector-servo configurations.

To detect the received signal and be able to generate the servo signals to aim the beam in the right direction, several detector layouts can be imagined. In the following figures the rectangular areas labelled A, B, etc. or A1, A2, etc. indicate the active photon detection surfaces 8R; and the dots indicate the spots of light falling on the detector surface as created by the lens array 4. The left/right arrows indicate the direction of receiver or source selection by addressing circuitry 7. The up/down arrows indicate the direction of lens movement. In these pictures a linear lens array is assumed, however it could also be extended to a square or hexagonal or any other array. From the detector configuration there are three signals that may be derived, as follows.

1. The direction of the incoming light in the receiver/source selection plane. (used to switch on the right light source for the return signal. This may be referred to herein as $S_{select}$.
2. A servo signal to be able to position the lens array actuator. This may be referred to herein as $S_{lens-act}$.
3. The high frequency modulated data signal. This may be referred to herein as $S_{rf}$.

Figure 10:
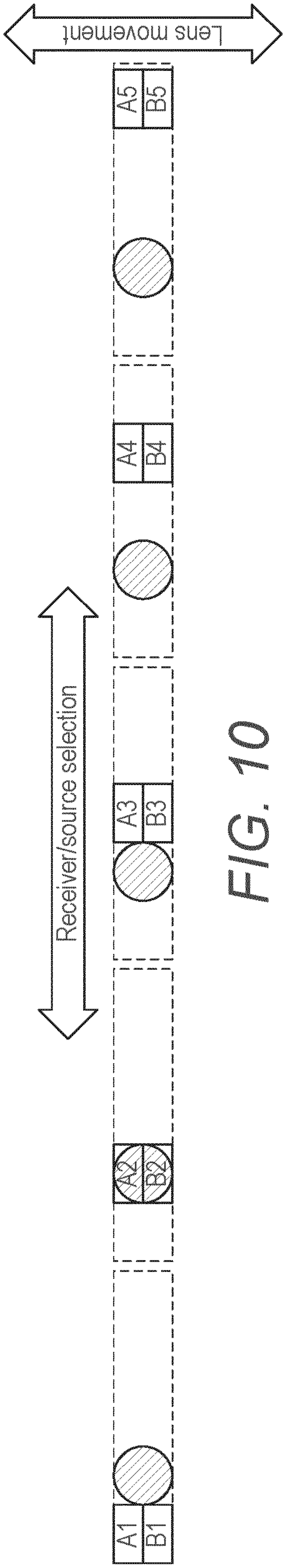
FIG. 10 is a schematic illustration of a receiver array for detecting a direction of a light source in accordance with embodiments disclosed herein.
Figure 11:
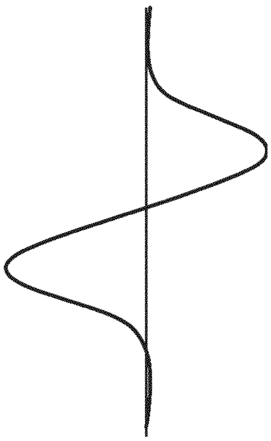
FIG. 11 is a schematic sketch of an example of a comparison signal in accordance with embodiments disclosed herein.

FIG. 10 shows a basic configuration where, depending on the incident angle, one (or two) of the spots ends up on one (or two) of the detectors.

By determining which detector pair receives the biggest signal, the direction where to retransmit can be derived. This can be expressed as:

$$S_{select} = \text{maximum of}(A_1 + B_1; \ldots; A_n + B_n)$$

where n indicates the number of detector pairs. This signal $S_{select}$ indicates from which direction the received signal is coming in the selection direction. This can also be used to select the detector pair to derive the high frequency data signal from. In case the spot is in between two detectors, the signals from these two detectors can beneficially be summed to increase the signal to noise ratio. In the perpendicular direction the servo signal $S_{lens-act}$ that is used to actuate the lens array can be derived from:

$$S_{lens-act} = \frac{A_{1-n} - B_{1-n}}{A_{1-n} + B_{1-n}}$$

where $A_{1-n}=A_1+A_2+A_3+A_4 \ldots A_n$ and $B_{1-n}=B_1+B_2+B_3 \ldots B_n$. When $S_{lens-act}$ is negative (B bigger than A), the lens array (and thereby the spots) should move upward in the picture (FIG. 10) and vice versa. The denominator assures that the servo signal is normalized such that the servo signal is independent of the incident optical power. An example of the servo signal as a function of the vertical spot movement is presented in FIG. 11. Beneficially, one may derive the Slens-act signal only from the detector pair that has been selected by Sselect as this would result in the highest SNR; if the selected pair is indicated by As and Bs, then Slens-act=(As−Bs)/(As+Bs). Alternatively, two (if these pairs show about equal signal) or more (if neighbouring pairs still contribute to a signal) detector pairs may be used for deriving Slens, based on the Sselect outcome. The data signal Srf=As+Bs, or the summation of the signals from two or more detector pairs based on the Slens outcome.

Figure 12:
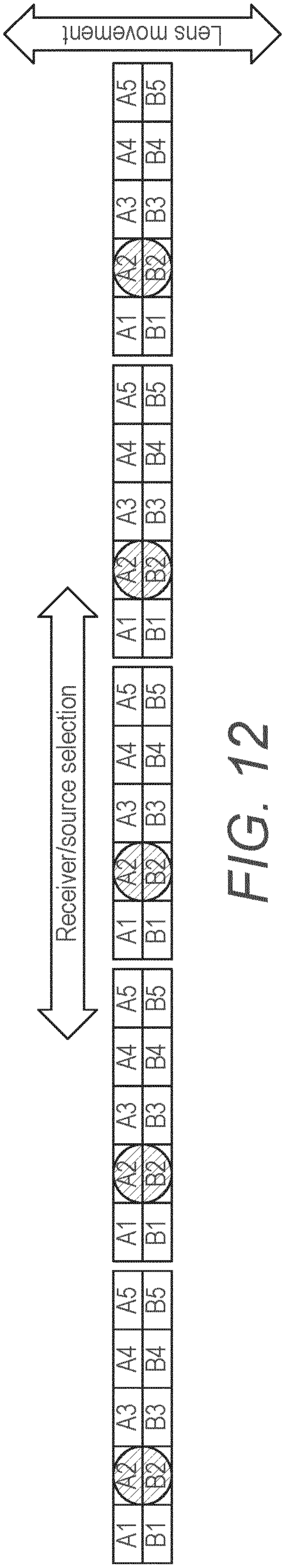
FIG. 12 is a schematic illustration of another receiver array for detecting a direction of a light source in accordance with embodiments disclosed herein.

A drawback of the configuration of FIG. 10 is that only one spot is being used for data detection, which limits the received optical power. In FIG. 12 a further improved detector arrangement is presented mitigating this drawback. The "dead areas" have been removed and all spots can now contribute to the signal detection. In this case all detector segments with the same label are connected together, i.e., their signals are summed.

This further improved detector configuration can use the same servo signals as described above.

Figure 13:
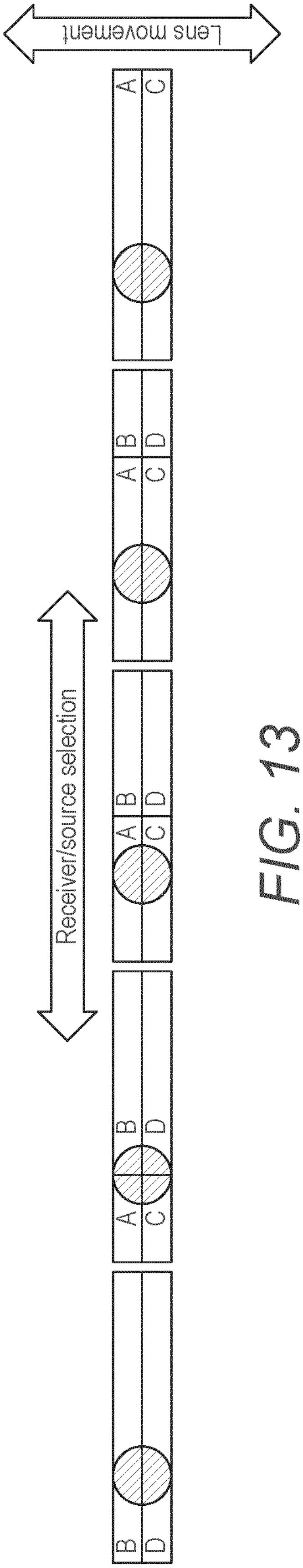
FIG. 13 is a schematic illustration of another receiver array for detecting a direction of a light source in accordance with embodiments disclosed herein.

An alternative detector configuration that removes the dead areas in the detector array while limiting the number of segments and split lines can be found in FIG. 13. Here each spot falls on a separate elongated detector where the split lines between AC and BD is shifted horizontally from segment to segment. Depending on the horizontal position of the spots, more or less light will fall on the left or right of all split lines. Again, all segments with the same label are connected.

The normalized servo signal determining the receiving direction can be derived from:

$$S_{select} = \frac{A + C - B - D}{A + C + B + D}$$

The normalized servo signal for the direction of the lens array movement can be derived from:

$$S_{lens-act} = \frac{A + B - C - D}{A + B + C + D}$$

The data signal can be derived by summing all segments together:

$$S_{rf} = A + B + C + D$$

Figure 14:
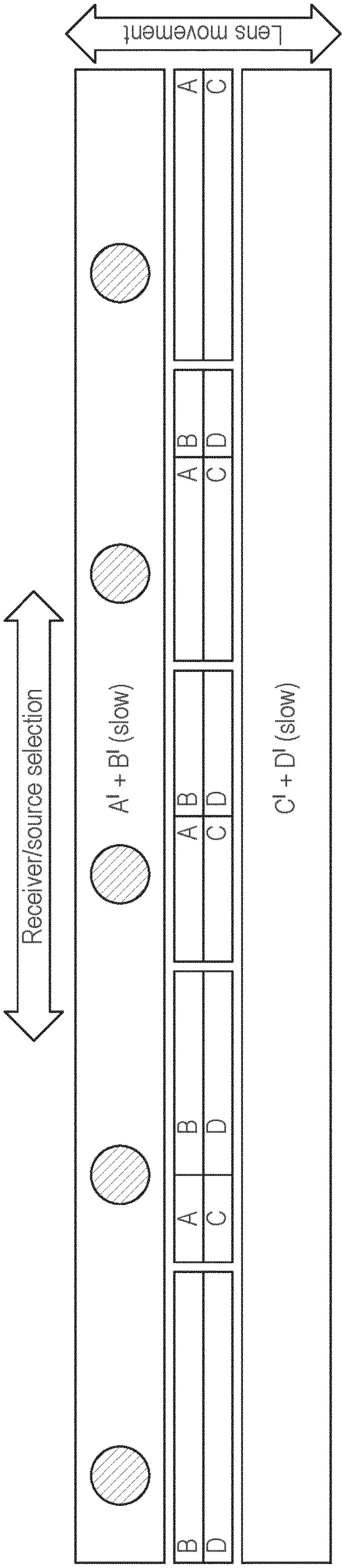
FIG. 14 is another schematic illustration of a receiver array for detecting a direction of a light source in accordance with embodiments disclosed herein.

Note that the required band width for the various signals may be different. The data signal may require large bandwidths even up to 100 Ghz, while the servo signals may be limited to frequencies below 1 MHz or even less. As the bandwidth of a detector becomes smaller for larger detector areas, it is beneficial to limit the size of the segments used for data retrieval. For the lens movement servo signals, one would like to use larger segments to enlarge the capture range of this servo. FIG. 14 shows a detector configuration with two additional large segments (A'+B', C'+D') that can be used to enlarge the capture range of the servo, while maintaining small detection areas for the high frequency data signal.

The signals from A'+B' and C'+D' can be slow as these are only used to capture the spots and move these towards the center segments (A, B, C, D)

$$\text{large capture range moving lens sevo} = \frac{A' + B' - C' - D'}{A' + B' + C' + D'}$$

This signal can be used to drive the spots towards the center segments. Once in range of the center segments, one can switch to the $S_{lens\text{-}act}$ signal for fine-tuning of the lens array position:

$$S_{lens-act} = \frac{A + B - C - D}{A + B + C + D}$$

Alternatively, a combined servo signal can be used:

$$S_{lens-act-large-range} = \frac{A + B - C - D + (A' + B') - (C' - D')}{A + B + C + D(A' + B') + (C' + D')}$$

The data signals can still be derived from the A, B, C, D central segments keeping the detector size small.

$$S_{rf} = A + B + C + D$$

In other embodiments, further segmentations and permutations of configurations are possible in line with the principles described above.

It will be appreciated that the above embodiments have been described by way of example only.

More generally, according to one aspect disclosed herein, there is provided apparatus comprising: an optical component comprising at least one or more first lenses; at least a series of first active elements, each of the first active elements being operable to receive light; an actuator arranged to effect a relative movement between the optical component and the series of first active elements in a first direction; and addressing circuitry operable to selectively activate a selected subset of one or more of the first active elements, from among a plurality of possible subsets, to receive light. Each of the first active elements is disposed behind a respective one of the first lenses so as when activated to receive light through the respective lens. Further, different ones of the first active elements are arranged at different positions relative to their respective lens in a second direction non-parallel to the first direction, and thus by selecting which of the first active elements to activate using the addressing circuitry, a first transmitting or receiving beam can be controlled to be formed at a selected angle in a first dimension as determined by the position of the activated element relative to its respective lens. By operating the actuator to effect a relative motion between the optical component and the series of first active elements in the second direction, the first transmitting or receiving beam can be controlled to be formed at a selected angle in a second dimension non-parallel to the first dimension.

According to another aspect, there is provided an apparatus comprising: a lens array comprising at least a series of first lenses arranged along an axis of the series of first lenses; at least a series of first active elements arranged along an axis of the series of first active elements parallel to the axis of the series of first lenses, each of the first active elements being operable to receive light; an actuator arranged to effect a relative movement between the lens array and the series of first active elements in a direction perpendicular to the axis of the series of first lenses; and addressing circuitry operable to selectively activate a selected subset of one or more of the first active elements, from among a plurality of possible subsets, to receive light; wherein each of the first active elements is disposed behind a respective one of the first lenses so as when activated to receive light through the respective lens; different ones of the first active elements are arranged at different positions relative to their respective lenses along the axis of the series of first active elements, and thus by selecting which of the first active elements to activate using the addressing circuitry, a first transmitting or receiving beam can be controlled to be formed at a selected angle in a second dimension as determined by the position of the activated element relative to its respective lens; and by operating the actuator to effect a relative motion between the lens array and the series of first active elements in the direction perpendicular to the axis of the series of first lenses, the first transmitting or receiving beam can be controlled to be formed at a selected angle in a first dimension perpendicular to the second dimension.

In embodiments the second direction is perpendicular to the first direction, and the second dimension is perpendicular to the first dimension.

Preferably the optical component is a lens array, the one or more first lenses being a series of first lenses arranged along an axis of the series of first lenses.

Note that moving the optical component or lens array relative to a series of active elements may be implemented by moving the lens array or moving the series of active elements.

Preferably the actuator cannot, by the relative motion it effects, steer the beam in the first dimension. Preferably the addressing circuit cannot select to steer the beam in the second dimension.

In embodiments, the optical component is a lens array, the one or more first lenses being a series of first lenses arranged along an axis of the series of first lenses; and the series of first active elements is arranged along an axis of the series of first active elements parallel to the axis of the series of first lenses. In such embodiments, the first direction, in which the relative motion is effected, may be non-parallel to the axis of the series of first lenses. Further, at least some of the first active elements are disposed behind different respective ones of the first lenses than others of the first active elements, and different ones of the first active elements are arranged at different positions relative to their respective lenses along the axis of the series of first active elements. The operating of the actuator comprises operating the actuator to effect a relative motion between the lens array and the series of first active elements in the first direction non-parallel to the axis of the series of first lenses.

In embodiments the first direction is perpendicular to the axis of the series of first lenses.

The series of first lenses may be a regular series having a first regular spacing between the first lenses along the axis of that series. The series of first active elements may be a regular series having a second regular spacing between the first active elements along the parallel axis. In this case the first regular spacing has a first spatial period (first pitch) and the second regular spacing has a second spatial period (second pitch) that is different than the first spatial period.

The first active elements may all be behind their own different respective ones of the first lenses. Or alternatively some of the first active elements could be behind the same first lens as one another and some could be behind different first lenses.

In some embodiments, the first active elements may be divided into a plurality of different subsets, at least one of the subsets comprising more than one of the first active elements, wherein within each subset the first active elements are disposed behind the same respective one of the first lenses, and different subsets are disposed behind different ones of the first lenses.

For example, the lens array may also comprises a series of second lenses arranged along an axis of the second series of lenses parallel to the axis of the series of first lenses; and the apparatus may further comprise a series of second active elements. In such embodiments, the addressing circuitry may be operable to selectively activate different ones of the second active elements to emit or receive light; and each of the second active elements may be disposed behind a respective one of the second lenses so as when activated to emit or receive light through the respective lens, with at least some of the second active elements being disposed behind different respective ones of the second lenses than others of the second active elements. Further, different ones of the second active elements may be arranged at different positions relative to their respective lenses along an axis of the second series of active-elements parallel to the axes of the first and second series of lenses, such that by selecting which of the second active elements to activate using the addressing circuitry, a second transmitting or receiving beam can be controlled to be formed at a selected angle in said second dimension. Further, being part of the same lens array, a relative motion between the series of second lenses and the series of second active elements is effected in unison with the relative motion between the series of first lenses and the series of first active elements, such that an angle of the second transmitting or receiving beam in said first dimension is also controlled along with the first transmitting or receiving beam when operating the actuator.

The series of first and second lenses may be formed from the same piece of glass, plastic or other such optical medium.

In embodiments the first and second active elements may be all emitting elements or all receiving elements.

Alternatively the first active elements may be emitting elements and the second active elements may be receiving elements, the first beam being a transmitting beam and the second beam being a receiving beam.

Either way, the series of first active elements may be configured to receive a first wavelength or spectral band of light and the series of second active elements are configured to emit or receive a second wavelength or spectral band of light different than the first wavelength or spectral band. E.g. the first active elements may receive on a first spectral band and the second active elements may emit or receive on a second spectral band, wherein the wavebands may be exclusive or may overlap.

In embodiments the first and second active elements may be all emitting elements or all receiving elements, and the positions of at least some of the second active elements relative to their respective lenses may be different than in the series of first lenses. This arrangement may be employed such that the series of second active elements extends an angular range over which the transmit or receive beam can be controlled to be formed in the first dimension.

Alternatively the positions of the first active elements relative to their respective first lenses within the series of first active elements may be the same as the positions of the second active elements relative to their respective second lenses within the series of second lenses. Thus the transmit and receive beams, or the different wavelength beams, can be produced at the same angle as one another.

In further alternative arrangements, the first direction may be parallel to the series of first lenses, such that the motion effected by the actuator is parallel to the series of first lenses, and different ones of the series of first active elements are disposed at different positions perpendicular or at least non-parallel to the axis of the series of first active elements.

In embodiments, the apparatus comprises a controller arranged to control the addressing circuitry to perform the selecting of the subset of active elements and the operating of the actuator by providing selection information to the addressing circuitry.

In embodiments, the controller may be configured to: detect receipt of a signal from a remote device at two or more of the receiving elements at different positions along the axis of the series of receiving elements; compare a signal strength of the received signal as received at each of the two or more receiving elements, and based thereon determine an orientation of the remote device relative to said apparatus in the second dimension; and based on the determined orientation in the second dimension, control the addressing circuitry to select one of the emitting elements to orient the transmitting beam toward the remote device in the second dimension.

In embodiments, in addition to the series of receiving elements, the apparatus may further comprise one or more offset receiving elements offset perpendicular to the axis of the series of receiving elements in the direction of motion of the lens array. In such embodiments the controller may be configured to: detect receipt of a signal from a remote device at at least one of the receiving elements in the series of receiving elements, and at at least one of the one or more offset receiving elements; compare a signal strength of the received signal as received at i) the at least one receiving element in the series with ii) the at least one offset receive element, and based thereon determine an orientation of the remote device relative to said apparatus in the first dimension; and based on the determined orientation in the first dimension, operate the actuator to orient the transmitting beam toward the remote device in the first dimension.

In some such embodiments, the apparatus may comprise a respective offset receiving element for each of the receiving elements in the series, each located behind the same respective lens at its respective receiving element in the series, at the same position along the axis of the series of receiving elements. In embodiments the comparison of signal strength may be between at least one of the receiving elements in the series and its respective offset receiving element.

In embodiments, the light which the first and/or second active elements are operable to emit or receive may comprise infrared light.

In embodiments the apparatus may be incorporated in a luminaire.

According to another aspect disclosed herein, there is provided a method of employing an optical component comprising at least one or more first lenses, and at least a series of first active elements, each of the first active elements being operable to receive light. The method comprises: using an actuator arranged to effect a relative movement between the optical component and the series of first active elements in a first direction; and using addressing circuitry to selectively activate a selected subset of one or more of the first active elements, from among a plurality of possible subsets, to receive light. Each of the first active elements is disposed behind a respective one of the first lenses so as when activated to receive light through the respective lens. Further, different ones of the first active elements are arranged at different positions relative to their respective lens in a second direction non-parallel to the first direction, and thus by selecting which of the first active elements to activate using the addressing circuitry, a first transmitting or receiving beam can be controlled to be formed at a selected angle in a second dimension as determined by the position of the activated element relative to its respective lens. And by operating the actuator to effect a relative motion between the optical component and the series of first active elements in the first direction, the first transmitting or receiving beam is controlled to be formed at a selected angle in a first dimension non-parallel to the second dimension.

In embodiments, the method may further comprise steps in accordance with the use of any of the apparatus features disclosed herein.

According to another aspect disclosed herein, there may be provided a computer program embodied on computer-readable storage and configured so as when run on one or more processors to perform any of the disclosed methods.

In embodiments, the program may be configured to perform further operations in accordance with the operation of any of the apparatus features disclosed herein.

Other variants or use cases of the disclosed techniques may become apparent to the person skilled in the art once given the disclosure herein. The scope of the disclosure is not limited by the described embodiments but only by the accompanying claims.

The invention claimed is:

1. Apparatus comprising:

an optical component comprising at least one or more first lenses;

at least a series of first active elements, each of the first active elements being operable to receive light;

an actuator arranged to effect a relative movement between the optical component and the series of first active elements in a first direction; and addressing circuitry operable to selectively activate a selected subset of one or more of the first active elements, from among a plurality of possible subsets, to receive light;

wherein each of the first active elements is disposed behind a respective one of the first lenses so as when activated to receive light through the respective lens;

different ones of the first active elements are arranged at different positions relative to their respective lens in a second direction non-parallel to the first direction, and thus by selecting which of the first active elements to activate using the addressing circuitry, a first receiving beam can be controlled to be formed at a selected angle in a second dimension as determined by the position of the activated element relative to its respective lens; and by operating the actuator to effect a relative motion between the optical component and the series of first active elements in the first direction, the first receiving beam can be controlled to be formed at a selected angle in a first dimension non-parallel to the second dimension.

2. The apparatus of claim 1, wherein:

the optical component is a lens array, the one or more first lenses being a series of first lenses arranged along an axis of the series of first lenses;

the series of first active elements is arranged along an axis of the series of first active elements parallel to the axis of the series of first lenses;

the first direction, in which the relative motion is effected, is non-parallel to the axis of the series of first lenses;

at least some of the first active elements are disposed behind different respective ones of the first lenses than others of the first active elements;

different ones of the first active elements are arranged at different positions relative to their respective lenses along the axis of the series of first active elements; and the operating of the actuator comprises operating the actuator to effect a relative motion between the lens array and the series of first active elements in the first direction non-parallel to the axis of the series of first lenses.

3. The apparatus of claim 2, wherein the first active elements are divided into a plurality of different subsets, at least one of the subsets comprising more than one of the first active elements, wherein within each subset the first active elements are disposed behind the same respective one of the first lenses, and different subsets are disposed behind different ones of the first lenses.

4. The apparatus of claim 2, wherein:

the lens array also comprises a series of second lenses arranged along an axis of the second series of lenses parallel to the axis of the series of first lenses;

the apparatus further comprises a series of second active elements;

wherein the addressing circuitry is operable to selectively activate a selected subset of one or more of the second active elements, from a plurality of possible subsets, to emit or receive light;

each of the second active elements is disposed behind a respective one of the second lenses so as when activated to emit or receive light through the respective lens, with at least some of the second active elements being disposed behind different respective ones of the second lenses than others of the second active elements;

different ones of the second active elements are arranged at different positions relative to their respective lenses along an axis of the second series of active-elements parallel to the axes of the first and second series of lenses, such that by selecting which of the second active elements to activate using the addressing circuitry, a second transmitting or receiving beam can be controlled to be formed at a selected angle in said second dimension; and being part of the same lens array, a relative motion between the series of second lenses and the series of second active elements is effected in unison with the relative motion between the series of first lenses and the series of first active elements, such that an angle of the second transmitting or receiving beam in said first dimension is also controlled along with the first receiving beam when operating the actuator.

5. The apparatus of claim 4, wherein second active elements are all emitting elements or all receiving elements, and the positions of at least some of the second active elements relative to their respective lenses are different than in the series of first lenses.

6. The apparatus of claim 4, wherein all the second active elements are emitting elements, and the second beam being a transmitting beam.

7. The apparatus of claim 4, wherein the positions of the first active elements relative to their respective first lenses within the series of first active elements are the same as the positions of the second active elements relative to their respective second lenses within the series of second lenses.

8. The apparatus of claim 4, wherein the series of first active elements are configured to receive a first wavelength or spectral band of light and the series of second active elements are configured to emit or receive a second wavelength or spectral band of light different than the first wavelength or spectral band.

9. The apparatus of claim 1, comprising a controller arranged to control the addressing circuitry to perform the selecting of the subset of active elements and the operating of the actuator by providing selection information to the addressing circuitry.

10. The apparatus of claim 9, wherein the controller is configured to:

detect receipt of a signal from a remote device at two or more of the receiving elements at different positions along the axis of the series of receiving elements;

compare a signal strength of the received signal as received at each of the two or more receiving elements, and based thereon determine an orientation of the remote device relative to said apparatus in the second dimension; and based on the determined orientation in the second dimension, control the addressing circuitry to select one of the emitting elements to orient the transmitting beam toward the remote device in the second dimension.

11. The apparatus of claim 10, wherein in addition to the series of receiving elements the apparatus further comprises one or more offset receiving elements offset perpendicular to the axis of the series of receiving elements in the direction of motion of the lens array; and the controller is configured to:

detect receipt of a signal from a remote device at at least one of the receiving elements in the series of receiving elements, and at at least one of the one or more offset receiving elements;

compare a signal strength of the received signal as received at i) the at least one receiving element in the series with ii) the at least one offset receive element, and based thereon determine an orientation of the remote device relative to said apparatus in the first dimension; and based on the determined orientation in the first dimension, operate the actuator to orient the transmitting beam toward the remote device in the first dimension.

12. The apparatus of claim 1, wherein the light which the first and/or second active elements are operable to emit or receive comprises infrared light.

13. A luminaire comprising the apparatus of claim 1.

14. A method of employing an optical component comprising at least one or more first lenses, and at least a series of first active elements, each of the first active elements being operable to receive light; the method comprising:

operating an actuator arranged to effect a relative movement between the optical component and the series of first active elements in a first direction; and operating addressing circuitry to selectively activate a selected subset of one or more of the first active elements, from among a plurality of possible subsets, to receive light;

wherein each of the first active elements is disposed behind a respective one of the first lenses so as when activated to receive light through the respective lens;

different ones of the first active elements are arranged at different positions relative to their respective lens in a second direction non-parallel to the first direction, and thus by selecting which of the first active elements to activate using the addressing circuitry, a first receiving beam can be controlled to be formed at a selected angle in a second dimension as determined by the position of the activated element relative to its respective lens; and by operating the actuator to effect a relative motion between the optical component and the series of first active elements in the first direction, the first receiving beam is controlled to be formed at a selected angle in a first dimension non-parallel to the second dimension.

15. A non-transitory computer-readable medium comprising instructions, the instructions when executed by one or more processors cause the one or more processors to perform the method of claim 14.

* * * * *